US009065968B2

(12) United States Patent
Kono et al.

(10) Patent No.: US 9,065,968 B2
(45) Date of Patent: Jun. 23, 2015

(54) IMAGE PROCESSING APPARATUS, IMAGE PROCESSING METHOD, AND COMPUTER-READABLE STORAGE DEVICE

(75) Inventors: Takashi Kono, Tachikawa (JP); Yamato Kanda, Hino (JP); Makoto Kitamura, Hachioji (JP); Takehiro Matsuda, Hachioji (JP); Masashi Hirota, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 937 days.

(21) Appl. No.: 13/248,460

(22) Filed: Sep. 29, 2011

(65) Prior Publication Data

US 2012/0076420 A1 Mar. 29, 2012

(30) Foreign Application Priority Data

Sep. 29, 2010 (JP) .................................. 2010-219801

(51) Int. Cl.
*H04N 5/14* (2006.01)
*G06T 7/00* (2006.01)

(52) U.S. Cl.
CPC .............. *H04N 5/142* (2013.01); *G06T 7/0085* (2013.01); *G06T 2207/10068* (2013.01); *G06T 2207/20136* (2013.01); *G06T 2207/30028* (2013.01); *G06T 2207/30092* (2013.01)

(58) Field of Classification Search
USPC .................. 382/199, 203, 256–258, 266, 300
See application file for complete search history.

(56) References Cited

U.S. PATENT DOCUMENTS 5,457,754 A * 10/1995 Han et al. ...................... 382/128
2009/0262247 A1* 10/2009 Huang et al. .................. 348/625

FOREIGN PATENT DOCUMENTS

JP 11-185010 A 7/1999
JP 2009-015735 1/2009

OTHER PUBLICATIONS

Notice of Rejection dated May 20, 2014 from related Japanese Application No. 2010-219801, together with an English language translation.

* cited by examiner

*Primary Examiner* — Wesley Tucker
(74) *Attorney, Agent, or Firm* — Scully, Scott, Murphy & Presser, PC

(57) ABSTRACT

An image processing apparatus includes a contour-candidate-edge detecting unit that detects, as contour candidate edges, edges based on a gradient magnitude of each pixel in a target image; a contour-edge detecting unit that detect contour edges by performing thresholding on gradient magnitudes of the contour candidate edges; an interpolation-line generating unit that generates interpolation lines for connecting end points of respective end-point pairs based on gradients of pixel values between the end points while each of the end point pairs is made up of an end point of an identical contour edge as a connection base and an end point of a different contour edge as a connection destination; and a contour-edge interpolating unit that selects one of the interpolation lines based on the gradients of pixel values on the interpolation lines and interpolates a contour edge between the end points with the selected interpolation line.

18 Claims, 16 Drawing Sheets

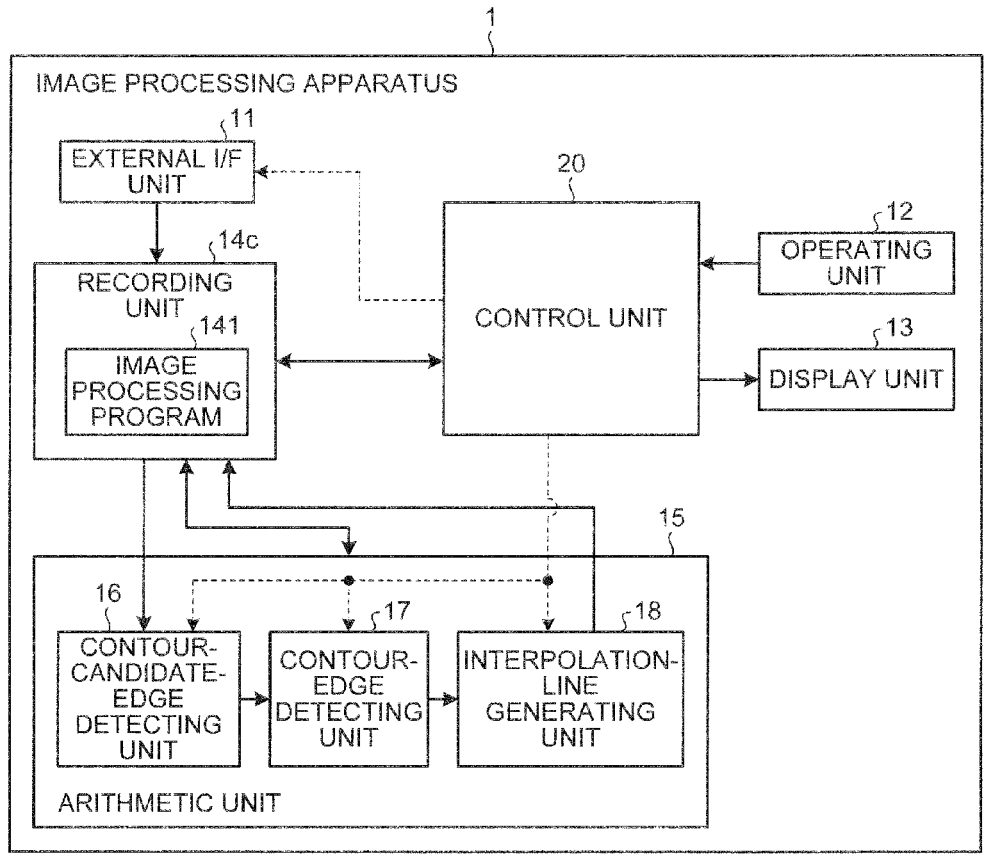
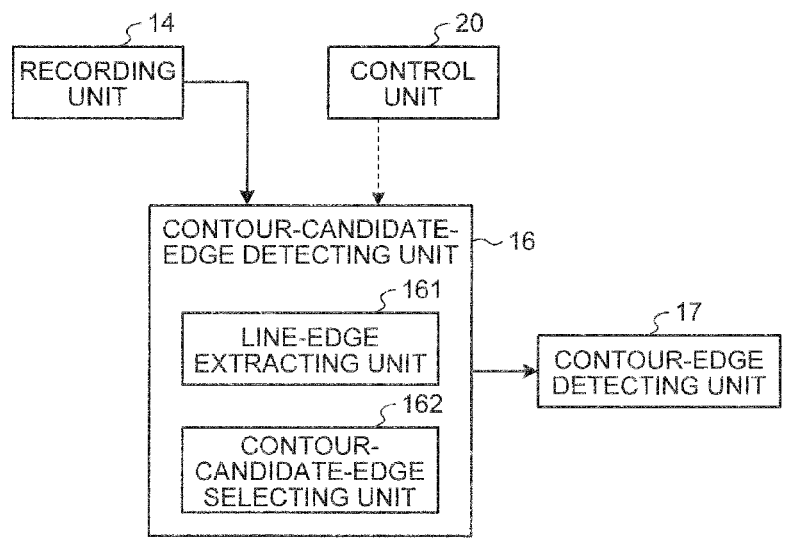

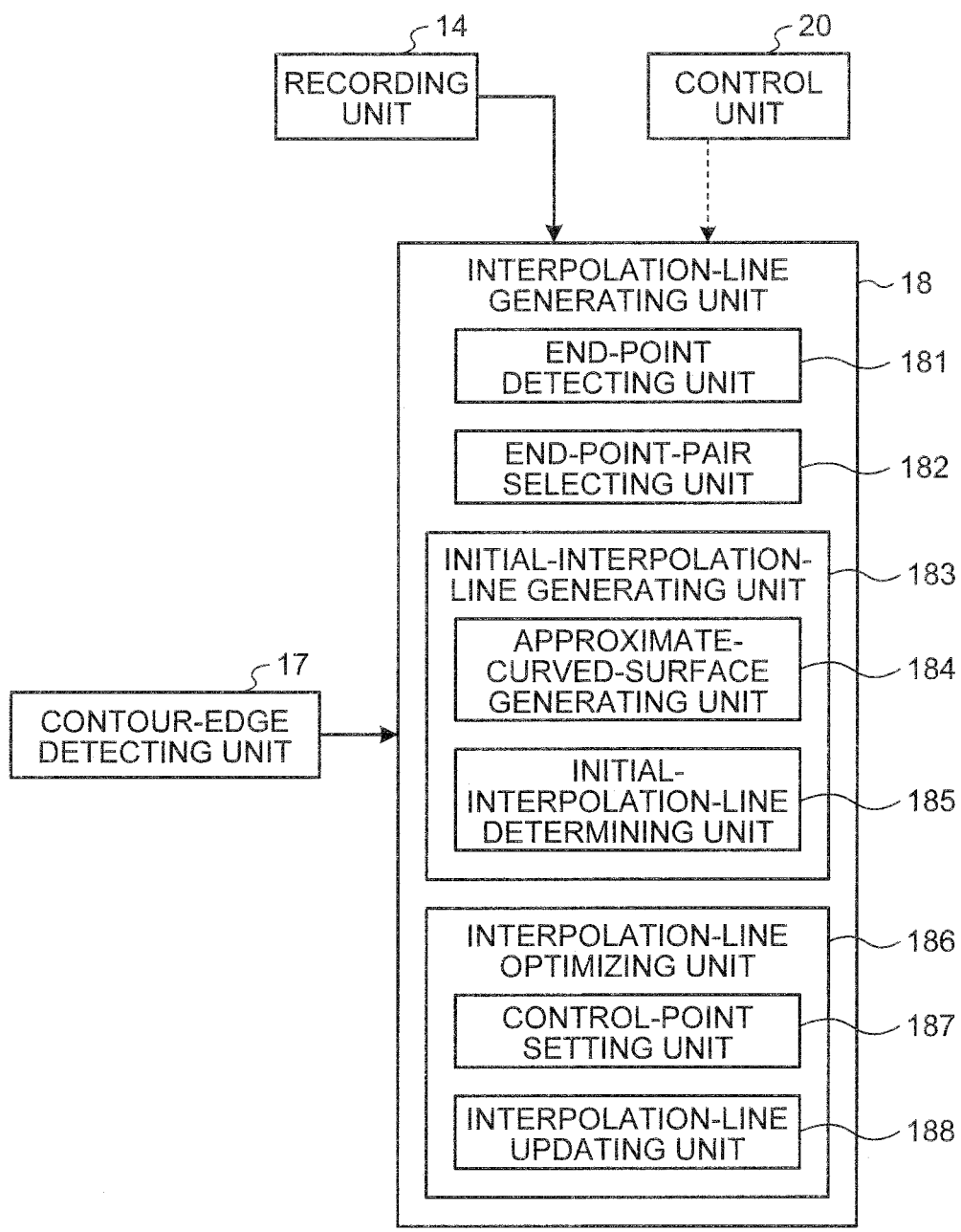

FIG.6
(a) 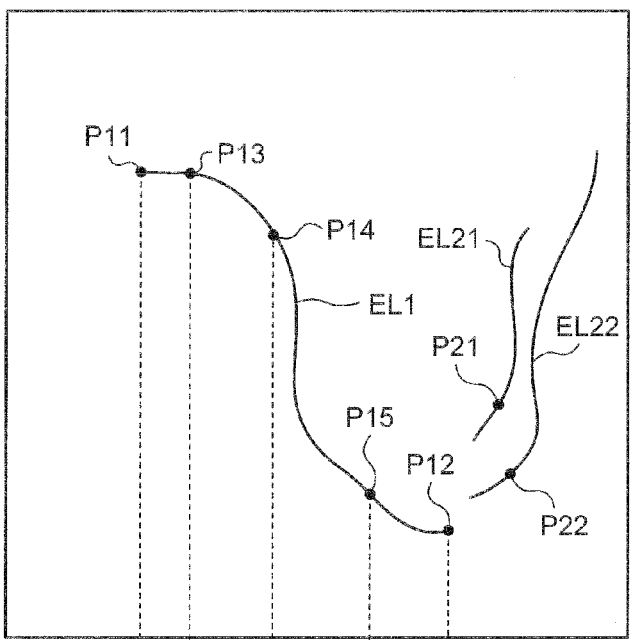
(b) 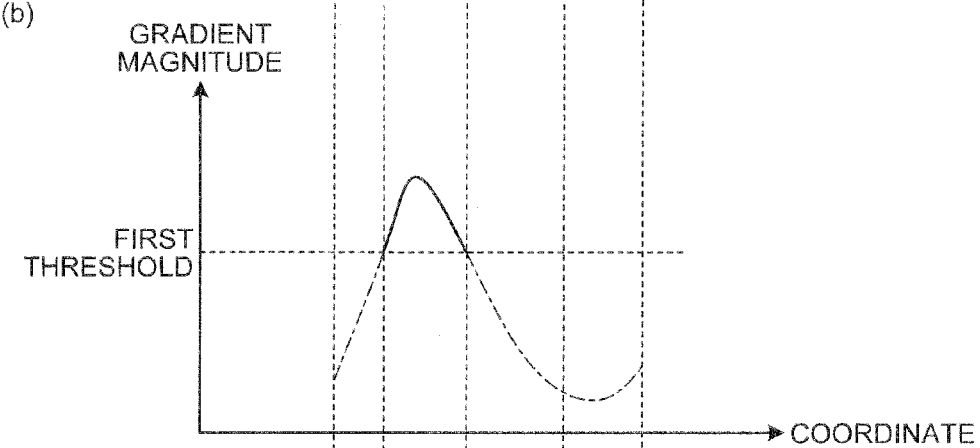
(c) 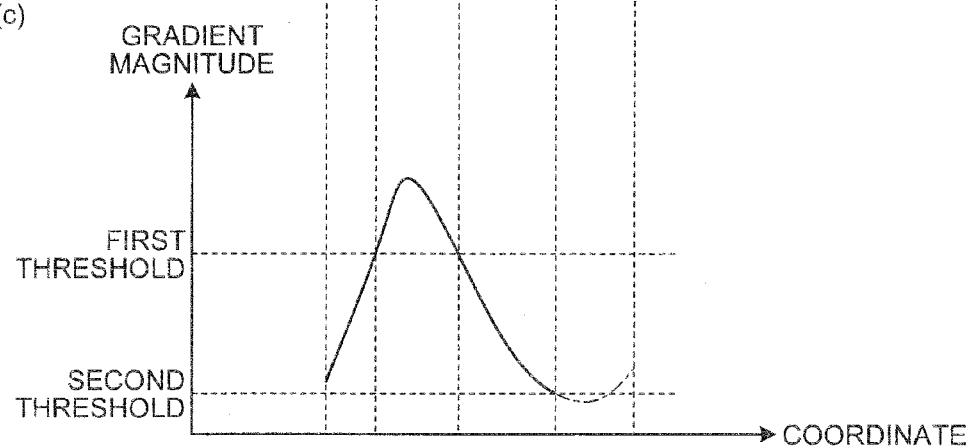

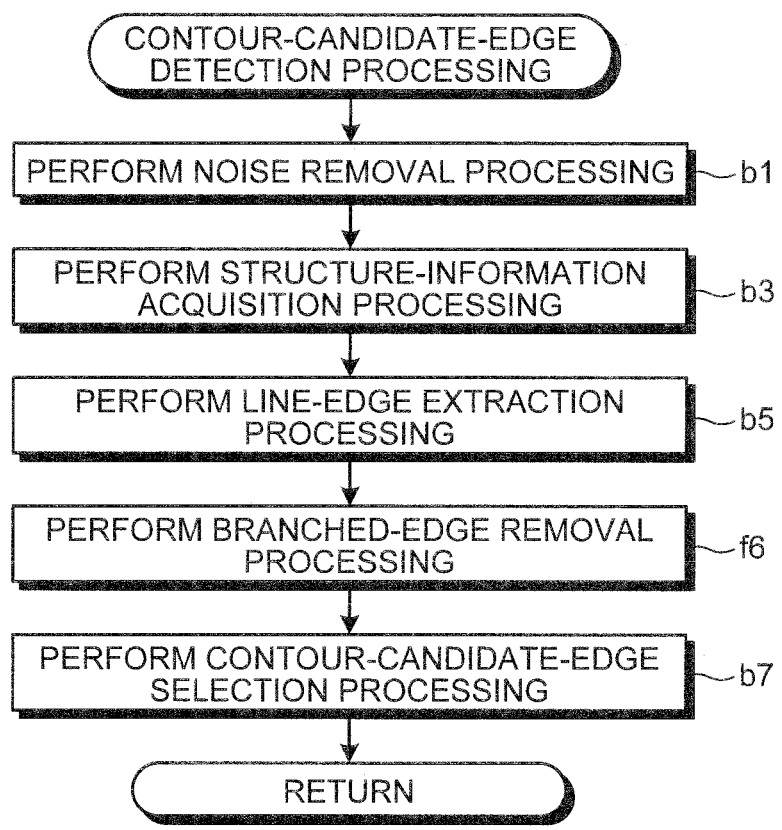

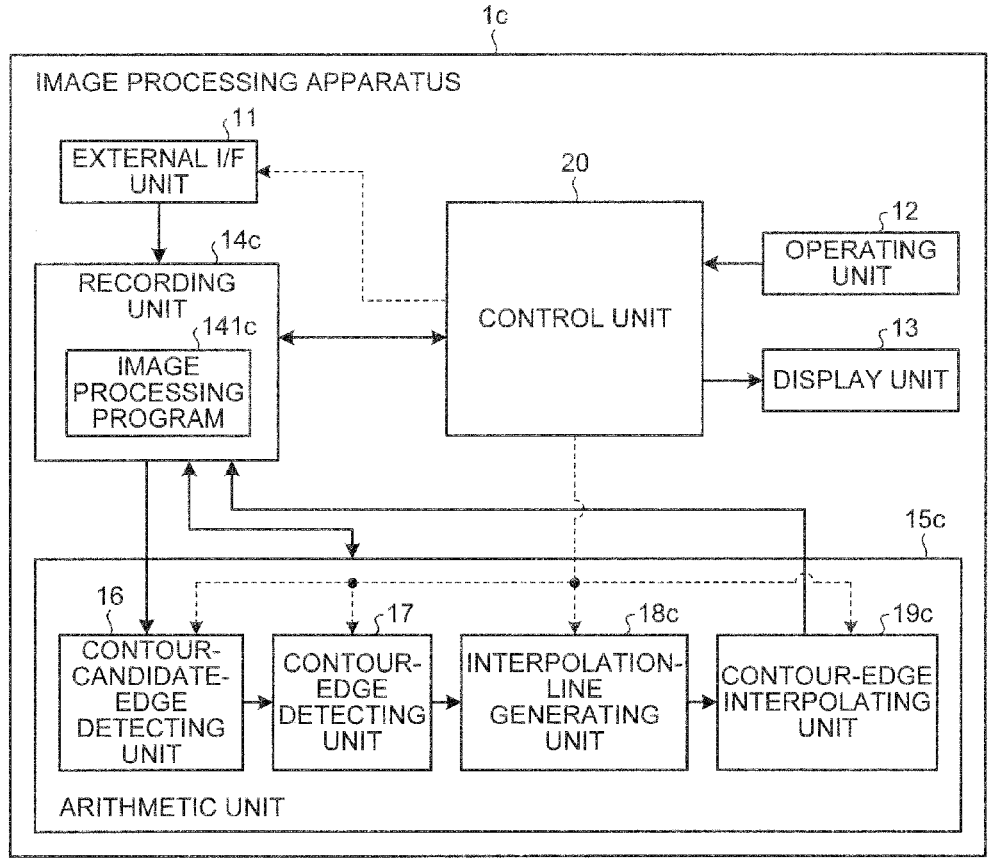
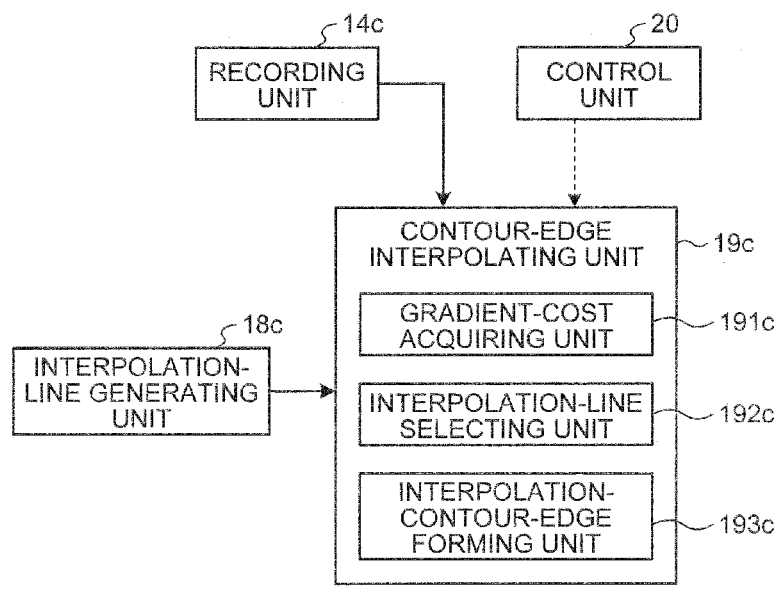

IMAGE PROCESSING APPARATUS, IMAGE PROCESSING METHOD, AND COMPUTER-READABLE STORAGE DEVICE

CROSS-REFERENCE TO RELATED APPLICATIONS

This application is based upon and claims the benefit of priority from Japanese Patent Application No. 2010-219801, filed on Sep. 29, 2010, the entire contents of which are incorporated herein by reference.

BACKGROUND OF THE INVENTION

1. Field of the Invention

The present invention relates to an image processing apparatus, an image processing method, and a computer-readable storage device for detecting a contour edge from a target image.

2. Description of the Related Art

In general, an edge in an image is detected by detecting a position at which a change in a gradient is the greatest (a position at which a gradient is steep and a value of the gradient is greater than those of adjacent positions). Basically, edges are detected by calculating gradient magnitudes from gradients of luminance values in an image and performing thresholding on the gradient magnitudes. When contour edges are detected from an image by using the above edge detection method, the contour edges may be discontinued due to various causes, such as the degree of precision of an edge detection algorithm, noise, or an unclear image (blurring), or due to a subjective contour portion. As a method of connecting such discontinued and discrete contour edges, an active contour method and an edge tracing method have been known. However, in the technique using the conventional active contour method, there is a problem in that it is difficult to appropriately discriminate edges that need to be connected from noise edges. Meanwhile, the edge tracing method is a method of tracing an edge on the basis of a direction in which the edge extends or on the basis of information on an orthogonal direction with respect to a differential. Thus, the edge tracing method is dependent on local information and therefore is disadvantageous to noise, so that edges that need to be connected may not be detected in some cases.

As a technology for solving the above conventional problems, Japanese Laid-open Patent Publication No. 2009-015735 discloses a method of appropriately determining a correspondence relation between edge-discontinued positions in order to connect (link) edges. In the technology disclosed in Japanese Laid-open Patent Publication No. 2009-015735, an area to be measured is divided into a plurality of small areas and numbers are assigned to the respective small areas. Subsequently, an individual edge label is assigned to each edge and a small area containing discontinued edges is extracted on the basis of distributions of the edges in each small area. Thereafter, edges that need to be connected are estimated from among adjacent edge labels in the extracted small area, and the estimated edges that need to be connected are smoothly connected to each other by using a Bezier curve or the like.

SUMMARY OF THE INVENTION

An image processing apparatus according to an aspect of the present invention includes a contour-candidate-edge detecting unit that detects edges on the basis of a gradient magnitude of each pixel in a target image, and sets the edges as contour candidate edges; a contour-edge detecting unit that detects contour edges by performing thresholding on gradient magnitudes of the contour candidate edges; an interpolation-line generating unit that generates a plurality of interpolation lines for connecting end points of respective end-point pair on the basis of gradients of pixel values between the end points of the respective end-point pairs, each of the end point pairs being made up of an end point of an identical contour edge as a connection base and an end point of a different contour edge as a connection destination; and a contour-edge interpolating unit that selects one of the interpolation lines on the basis of gradients of pixel values of pixels on the interpolation lines, and interpolates a contour edge between the end points which are to be connected with the selected interpolation line, with the selected interpolation line.

An image processing method according to another aspect of the present invention includes detecting edges on the basis of a gradient magnitude of each pixel in a target image and setting the edges as contour candidate edges; detecting contour edges by performing thresholding on gradient magnitudes of the contour candidate edges; generating a plurality of interpolation lines for connecting end points of respective end-point pairs on the basis of gradients of pixel values between the end points of the respective end-point pairs, each of the end point pairs being made up of an end point of an identical contour edge as a connection base and an end point of a different contour edge as a connection destination; and interpolating a contour edge between the end points to be connected by an interpolation line, the interpolating including selecting one of the interpolation lines on the basis of gradients of pixel values of pixels on the interpolation lines and interpolating the contour edge between the end points with the selected interpolation line.

A computer-readable storage device according to still another aspect of the present invention has an executable program stored thereon. The program instructs a processor to perform: detecting edges on the basis of a gradient magnitude of each pixel in a target image and setting the edges as contour candidate edges; detecting contour edges by performing thresholding on gradient magnitudes of the contour candidate edges; generating a plurality of interpolation lines for connecting end points of respective end-point pairs on the basis of gradients of pixel values between the end points of the respective end-point pairs, each of the end point pairs being made up of an end point of an identical contour edge as a connection base and an end point of a different contour edge as a connection destination; and interpolating a contour edge between end points to be connected by an interpolation line, the interpolating including selecting one of the interpolation lines on the basis of gradients of pixel values of pixels on the interpolation lines and interpolating the contour edge between the end points with the selected interpolation line.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of a functional configuration example of an image processing apparatus according to a first embodiment;

FIG. 2 is a block diagram of a configuration example of a contour-candidate-edge detecting unit according to the first embodiment;

FIG. 3 is a block diagram of a configuration example of an interpolation-line generating unit according to the first embodiment;

FIG. 6 is a diagram explaining a principle of detection of a contour edge;

FIG. 17 is a flowchart of a detailed procedure of contour-candidate-edge detection processing according to the first modification;

FIG. 20 is a block diagram of a functional configuration example of an image processing apparatus according to a second embodiment;

FIG. 21 is a block diagram of a configuration example of a contour-edge interpolating unit according to the second embodiment;

DETAILED DESCRIPTION OF THE PREFERRED EMBODIMENTS

Figure 4:
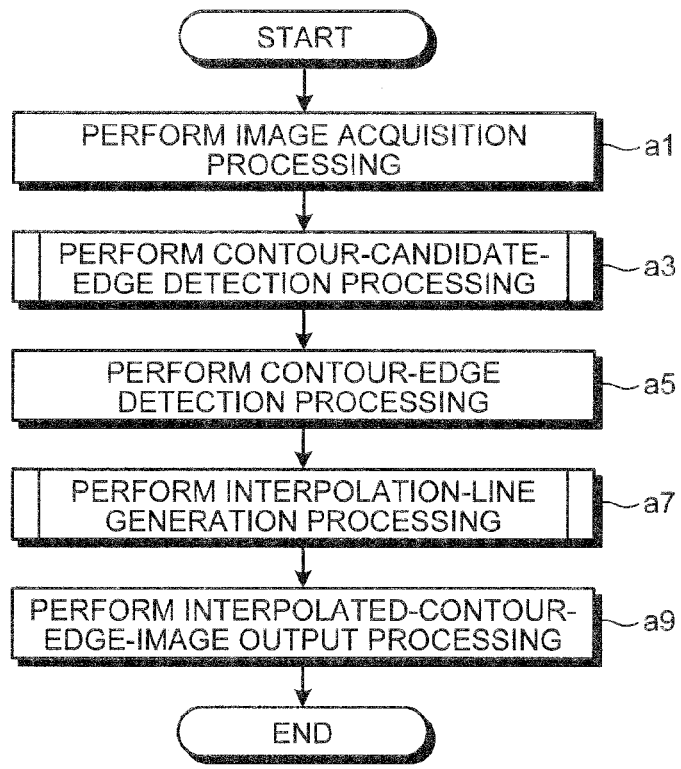
FIG. 4 is an overall flowchart of a procedure of processing performed by the image processing apparatus according to the first embodiment.

Exemplary embodiments of the present invention will be explained below with reference to the accompanying drawings. The present invention is not limited by the following embodiments. In the drawings, the same components are denoted by the same reference codes.

An image processing apparatus according to an embodiment processes, as a target image, an image (an intraluminal image) that is obtained by imaging the inside of a lumen, such as a digestive tract, in the body of a subject by a medical observation device, such as an endoscope or a capsule endoscope. More specifically, the image processing apparatus performs processing of detecting contour edges of a mucosal structure or the like from an intraluminal image and connecting discontinued contour edges to each other. The intraluminal image that the image processing apparatus of the embodiment handles is, for example, a color image in which pixel values corresponding to respective wavelength components for R (red), G (green), and B (blue) are assigned to each pixel. In the intraluminal image, a surface structure of a body tissue, such as a mucosal structure, mainly appears. In the following, an example will be explained in which contour edges of a mucosal structure or the like is detected from an intraluminal image and discontinued contour edges are connected to each other. However, the target image is not limited to the intraluminal image that is explained as an example in the embodiment. The present invention can be widely applied to any cases in which contour edges are detected from a target image and discontinued contour edges are connected to each other.

First Embodiment

An image processing apparatus according to a first embodiment will be described below. FIG. 1 is a block diagram of a functional configuration example of an image processing apparatus 1 according to the first embodiment. FIG. 2 is a block diagram of a configuration example of a contour-candidate-edge detecting unit 16 according to the first embodiment. FIG. 3 is a block diagram of a configuration example of an interpolation-line generating unit 18 according to the first embodiment. In FIGS. 1 to 3, data signal lines used for connecting the units of the image processing apparatus 1 to one another and sending data signals, such as image signals, are indicated by bold lines and control signal lines used for sending control signals are indicated by dashed lines.

As illustrated in FIG. 1, the image processing apparatus 1 of the first embodiment includes an external interface (I/F) unit 11, an operating unit 12, a display unit 13, a recording unit 14, an arithmetic unit 15, and a control unit 20 that controls the whole operation of the image processing apparatus 1.

The external I/F unit 11 is used for acquiring image data of an intraluminal image captured by a medical observation device, such as an endoscope or a capsule endoscope. The image data acquired by the external I/F unit 11 is recorded in the recording unit 14, processed by the arithmetic unit 15, and appropriately displayed on the display unit 13 as needed. When, for example, a portable recording medium (device) is used for exchanging the image data with the medical observation device, the external I/F unit 11 is structured as a reader device that reads the image data of the intraluminal image stored in the recording medium that is detachably attached thereto. When a server for storing the image data of the intraluminal image captured by the medical observation device is installed in an appropriate location such that the image data can be acquired from the server, the external I/F unit 11 is structured as a communication device or the like that makes a connection to the server. In this case, data communication with the server is performed via the external I/F unit 11 in order to acquire the image data of the intraluminal image. When the image data is to be acquired from the medical observation device via a cable, the external I/F unit 11 is structured as an interface device or the like that inputs the image data.

The operating unit 12 is realized by, for example, a keyboard, a mouse, a touch panel, or various switches and outputs an operating signal to the control unit 20. The display unit 13 is realized by a display device, such as an LCD or an EL display, and displays various screens including a screen for displaying an image captured by a medical observation device, such as a capsule endoscope, by being controlled by the control unit 20.

The recording unit 14 is realized by an information recording medium and a reader device of the information recording medium. Examples of the information recording medium include a ROM as an IC memory, such as a flash memory, that can update recorded information; a RAM as an IC memory; a built-in hard disk; a hard disk that is connectable via a data communication terminal; and a CD-ROM. In the recording unit 14, a computer program for operating the image processing apparatus 1 and realizing various functions of the image processing apparatus 1, data to be used while the computer program is being executed, and the like are recorded. For example, the image data of the intraluminal image acquired by the external I/F unit 11 is recorded in the recording unit 14. Furthermore, in the recording unit 14, an image processing program 141 is recorded that is used for implementing processing of the first embodiment in order to detect contour edges of a mucosal structure or the like from the intraluminal image and connect discontinued contour edges to each other.

The arithmetic unit 15 is realized by hardware, such as a CPU, and performs various types of arithmetic processing in order to process the intraluminal image to detect contour edges of a mucosal structure or the like and connect discontinued contour edges to each other. The arithmetic unit 15 includes the contour-candidate-edge detecting unit 16, a contour-edge detecting unit 17, and the interpolation-line generating unit 18. The contour-candidate-edge detecting unit 16, the contour-edge detecting unit 17, and the interpolation-line generating unit 18 are connected to one another in this order. The contour-candidate-edge detecting unit 16 receives input of an image signal of the intraluminal image that has been acquired via the external I/F unit 11 and recorded in the recording unit 14. The interpolation-line generating unit 18 outputs information on an interpolated contour edge (an interpolated contour edge image) that has been obtained by processing the intraluminal image by the units of the arithmetic unit 15, and the information is recorded in, for example, the recording unit 14.

The contour-candidate-edge detecting unit 16 detects contour candidate edges from the intraluminal image being a processing object. The contour-candidate-edge detecting unit 16 includes, as illustrated in FIG. 2, a line-edge extracting unit 161 and a contour-candidate-edge selecting unit 162.

The line-edge extracting unit 161 extracts line edges on the basis of a gradient magnitude of each pixel in the intraluminal image. The line edges are edges with 1-pixel widths. The contour-candidate-edge selecting unit 162 selects, as contour-candidate edges, line edge portions formed of pixels that are contained in an area other than a flat area (an area that is flat because a change in a gradient is small) in the intraluminal image among pixels on the edge line. The contour-candidate-edge detecting unit 16 structured as above outputs the contour candidate edges to the contour-edge detecting unit 17.

The contour-edge detecting unit 17 performs thresholding on the gradient magnitudes of the respective pixels on the contour candidate edges input from the contour-candidate-edge detecting unit 16 and detects contour edges. The contour-edge detecting unit 17 outputs the detected contour edges to the interpolation-line generating unit 18 together with the contour candidate edges.

The interpolation-line generating unit 18 generates an interpolation line for interpolating discontinued contour edges. According to the first embodiment, the interpolation-line generating unit 18 generates an interpolation line for connecting end points of contour edges. The interpolation-line generating unit 18 includes, as illustrated in FIG. 3, an end-point detecting unit 181, an end-point-pair selecting unit 182, an initial-interpolation-line generating unit 183, and an interpolation-line optimizing unit 186.

The end-point detecting unit 181 detects end points of the contour edges input from the contour-edge detecting unit 17. The end-point-pair selecting unit 182 selects, as an end-point pair, two end points from among the end points detected by the end-point detecting unit 181. According to the first embodiment, at least one end point of different contour edges is selected as a connection object for each of the end points of the contour edges in order to form the end-point pair.

The initial-interpolation-line generating unit 183 generates an initial path of an interpolation line (hereinafter, appropriately described as an "initial interpolation line") for connecting the end points being the end-point pair selected by the end-point-pair selecting unit 182. The initial-interpolation-line generating unit 183 includes an approximate-curved-surface generating unit 184 and an initial-interpolation-line determining unit 185. The approximate-curved-surface generating unit 184 generates an approximate curved surface by approximating a change in pixel values on the basis of the pixel value of each pixel in the intraluminal image. The initial-interpolation-line determining unit 185 determines an initial interpolation line on the basis of the approximate curved surface generated by the approximate-curved-surface generating unit 184.

The interpolation-line optimizing unit 186 optimizes the initial path of the interpolation line (the initial interpolation line) so that a cost value, which is determined by gradient magnitudes of pixels (pixel-value gradients) on the interpolation line (hereinafter, the cost value is described as a "gradient cost"), becomes the smallest. For example, the interpolation-line optimizing unit 186 applies a known active contour model (snake) in order to optimize the initial interpolation line to obtain an interpolation line. The interpolation-line optimizing unit 186 includes a control-point setting unit 187 and an interpolation-line updating unit 188. The control-point setting unit 187 sets control points on the initial interpolation line. The interpolation-line updating unit 188 calculates a gradient cost for each of the control points set by the control-point setting unit 187 and updates the initial path of the interpolation line by moving the control points so that the gradient costs are reduced.

The interpolation-line generating unit 18 structured as above generates an interpolated contour edge on the basis of the generated interpolation line and contour edges that are connected by the interpolation line, and then outputs an interpolated contour edge image, in which a pixel value of each pixel is represented as flag information indicating whether the pixel is on the interpolated contour edge or not, to the recording unit 14 for storing the contour edge image.

The control unit 20 is realized by hardware, such as a CPU. The control unit 20 sends instructions or data to the units included in the image processing apparatus 1 on the basis of image data acquired via the external I/F unit 11, an operating signal input from the operating unit 12, or computer programs and data recorded in the recording unit 14, thereby integrally controlling the whole operation of the image processing apparatus 1.

FIG. 4 is an overall flowchart of a procedure of processing performed by the image processing apparatus 1 according to the first embodiment. The processing explained below is implemented by causing the units of the image processing apparatus 1 to operate in accordance with the image processing program 141 recorded in the recording unit 14.

As illustrated in FIG. 4, the control unit 20 performs image acquisition processing to acquire an intraluminal image as a processing object (Step a1). In this processing, image data of the intraluminal image is acquired via the external I/F unit 11 and recorded in the recording unit 14. After being acquired in the above manner, the image data of the intraluminal image becomes readable by the arithmetic unit 15. In the following, a lateral coordinate of a pixel is represented by x and a longitudinal coordinate of the pixel is represented by y on the assumption that an upper left corner of the intraluminal image is the origin of coordinates.

Figure 5:
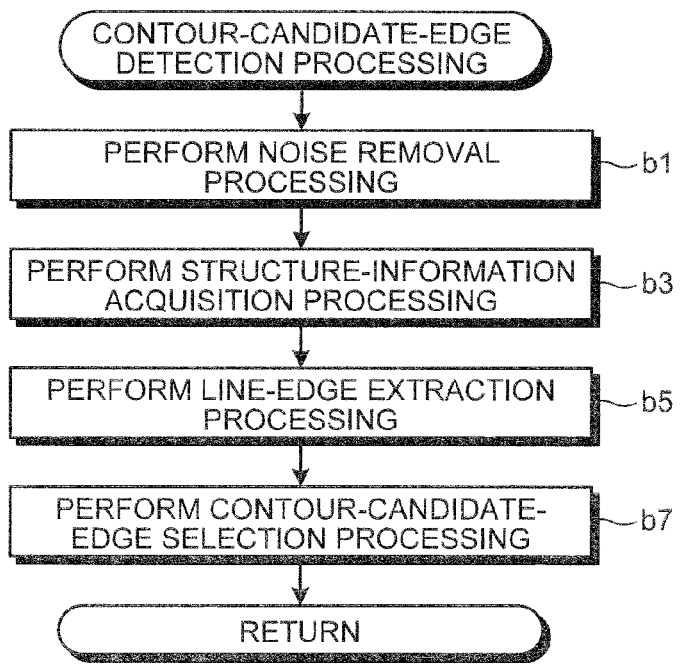
FIG. 5 is a flowchart of a detailed procedure of contour-candidate-edge detection processing according to the first embodiment.

In the arithmetic unit 15, the contour-candidate-edge detecting unit 16 performs contour-candidate-edge detection processing (Step a3). In the contour-candidate-edge detection processing, a gradient magnitude of each pixel is calculated. Then, a position (ridge) at which a change in a gradient is the greatest in each gradient range, in which a gradient direction is identical, is detected on the basis of the calculated gradient magnitude of each pixel, so that contour candidate edges are obtained. FIG. 5 is a flowchart of a detailed procedure of the contour-candidate-edge detection processing according to the first embodiment.

As illustrated in FIG. 5, in the contour-candidate-edge detection processing, the line-edge extracting unit 161 of the contour-candidate-edge detecting unit 16 performs noise removal processing to remove noise from the intraluminal image (Step b1). The noise removal processing can be implemented by performing, for example, edge-preserving smoothing processing on the image data of the intraluminal image acquired at Step a1 of FIG. 4. In this example, the smoothing processing is performed by using, for example, a median filter that is useful for dealing with spike noise. This is because the intraluminal image may contain an area, in which illumination light has been regularly reflected (a regular-reflection area), as a noise area corresponding to spike noise. A filter size is, for example, 11×11. The intraluminal image contains not only a contour edge of a mucosal structure but also irregularities due to tiny projections (villi) or edges (noise edges) due to a regular reflection area that is caused by illumination light. With the noise removal processing at Step b1, it is possible to suppress the above-mentioned noise edges, enabling to reduce error detection of a contour edge. The smoothing processing may be performed by using other edge-preserving filters, such as a k-nearest neighbor averaging filter or a bilateral filter, instead of the median filter.

The line-edge extracting unit 161 performs structure-information acquisition processing to acquire shape change information on a surface of a mucosal structure on the basis of the image data of the intraluminal image that has been subjected to the noise removal processing at Step b1 (Step b3). Hemoglobin, as a component of a blood vessel or a bleeding site that appears in the intraluminal image, has the property of absorbing a large amount of light in a short wavelength range. Because hemoglobin has the light absorption characteristics in the short wavelength range, luminance values of G (green) components and B (blue) components, of which wavelength components are mostly in the short wavelength range, are reduced due to light absorption by hemoglobin. Therefore, a blood vessel and a bleeding site may appear as noise edges in the intraluminal image. Meanwhile, R (red) components, of which wavelength components are mostly in a long wavelength range, absorb only a small amount of light but reflect most of light. Therefore, it is possible to obtain information that most reflects a mucosal structure from the R (red) components. In view of the above, according to the first embodiment, to detect a contour edge of a mucosal structure with high precision in the subsequent processing, image data of an image of an R (red) wavelength component (an R component) (hereinafter, described as an R component image, i.e., an image in which pixel values of each pixel are represented as values of R (red) components) is acquired as the shape change information on the surface of a mucosal structure. With the structure-information acquisition processing at Step b3, it is possible to reduce the frequency of a situation in which a noise edge that appears due to change in a color of a surface of a mucous membrane is erroneously detected as a contour edge.

The line-edge extracting unit 161 performs line-edge extraction processing (Step b5). A processing procedure is explained below. The line-edge extracting unit 161 performs differential filter processing using a first-order differential filter on the R component image I(x, y) acquired at Step b3, to thereby calculate a gradient magnitude g(x, y) of each pixel. In this example, a sobel filter is applied in order to obtain a gradient magnitude image (an image in which pixel values of all pixels are represented by values of the gradient magnitudes), a lateral-component gradient magnitude image (an image in which pixel values of all pixels are represented by values of lateral components of the gradient magnitudes), and a longitudinal-component gradient magnitude image (an image in which pixel values of all pixels are represented by values of longitudinal components of the gradient magnitudes).

More specifically, a sobel filter of 3×3 for the lateral direction (the x direction) and a sobel filter of 3×3 for the longitudinal direction (the y direction) are applied in order to perform filter processing on a near-field region of 3×3. An output sobel X(x, y) of the differential filter processing that is performed with the sobel filter for the lateral direction is obtained as a lateral component of the gradient magnitude of each pixel. An output sobel Y(x, y) of the differential filter processing that is performed with the sobel filter for the longitudinal direction is obtained as a longitudinal component of the gradient magnitude of each pixel. Thereafter, the lateral component and the longitudinal component of the gradient magnitude are combined to obtain the gradient magnitude g(x, y) of each pixel. The differential filter processing may be performed by using other differential filters, instead of the sobel filter.

A direction θ(x, y), in which a change in a gradient becomes the greatest, is calculated as a gradient direction for each pixel in accordance with the following Equation (1) with the output sobel X(x, y), which is obtained through the differential filter processing performed by applying the sobel filter for the lateral direction on each pixel, and the output sobel Y(x, y), which is obtained through the differential filter processing performed by applying the sobel filter for the longitudinal direction on each pixel. In the following, the direction in which the change in the gradient becomes the greatest is described as a "gradient change direction".

$$\theta(x, y) = \arctan\left(\frac{sobelY(x, y)}{sobelX(x, y)}\right) \quad (1)$$

Thereafter, a convex position of the gradient magnitude g(x, y) is detected from a gradient range, in which the gradient change direction is identical, on the basis of the gradient change direction θ(x, y) of each pixel. The convex position is detected by determining the maximum value of the gradient magnitude g(x, y) from among pixels that have the same gradient change direction θ(x, y) and that are adjacent to each other in the gradient change direction. Consequently, it is possible to extract a line edge (an edge with a 1-pixel width).

The contour-candidate-edge selecting unit 162 performs contour-candidate-edge selection processing (Step b7). As a processing procedure, a flat area in the intraluminal image is first extracted. More specifically, an area in which a change in a gradient is small is extracted on the basis of the gradient magnitude g(x, y) of each pixel, and the extracted area is determined as a flat area. A range of the value of the gradient magnitude g(x, y) to be determined as the flat area is set in advance. Thereafter, a line edge portion formed of pixels that are contained in an area other than the flat area among pixels on the line edge is detected as a contour candidate edge.

Thereafter, a contour-candidate-edge gradient magnitude image is obtained, in which pixel values G(x, y) of pixels on the contour candidate edge are set to the gradient magnitude g(x, y) and pixel values G(x, y) of the other pixels are set to "0" in accordance with the following Equations (2) and (3).

When a pixel is on the contour candidate edge line, $$G(x,y)=g(x,y) \quad (2)$$

Other than the above, $G(x,y)=0$ (3)

Also, a contour-candidate edge image is obtained, in which a pixel value of each pixel is represented as flag information indicating whether the pixel is on the contour candidate edge line or not, in accordance with the following equations (4) and (5). More specifically, the contour-candidate edge image is obtained, in which pixel values H(x, y) on the contour candidate edge line are set to "1" and pixel values H(x, y) of the other pixels are set to "0".

When a pixel is on the contour candidate edge, $$H(x,y)=1 \quad (4)$$

Other than the above, $H(x,y)=0$ (5)

After the contour-candidate-edge detection processing is performed as described above, the processing returns to Step a3 of FIG. 4 and then proceeds to Step a5. At Step a5, the contour-edge detecting unit 17 performs contour-edge detection processing. In the contour-edge detection processing, pixels of which values of gradient magnitudes g(x, y) are small are excluded from the pixels on the contour candidate edge detected at Step a3, so that pixels to be contour edges are narrowed down. For example, the contour-edge detecting unit 17 performs hysteresis thresholding (two-staged thresholding) to detect the contour edges.

Shown in (a) of FIG. 6 is a schematic diagram of an example of the contour candidate edges detected at Step a3 of FIG. 4. In the figure, three contour candidate edges EL1, EL21, and EL22 are illustrated. Illustrated in (b) and (c) of FIG. 6 are a change curve of the gradient magnitude g(x, y) on the contour candidate edge EL1 in (a) of FIG. 6 on the assumption that a lateral axis represents a coordinate (x, y) on the contour candidate edge EL1 in (a) of FIG. 6 and a longitudinal axis represents a value of the gradient magnitude g(x, y) of each pixel. The contour-edge detecting unit 17 performs thresholding on the gradient magnitudes g(x, y) on the contour candidate edge EL1 by using a first threshold indicated in (b) of FIG. 6, thereby determining, as a contour edge, a range of the gradient magnitudes g(x, y) that are equal to or greater than the threshold, in particular, a range from a pixel P13 to a pixel P14 on the contour candidate edge EL1 illustrated in (a) of FIG. 6. Subsequently, the contour-edge detecting unit 17 performs thresholding on the gradient magnitudes g(x, y) on the contour candidate edge EL1 by using a second threshold, which is smaller than the first threshold as indicated in (c) of FIG. 6, thereby further detecting, as contour edges, pixels that are on the contour candidate edge EL1 and continued from the pixels P13 and P14 being end points of the range that has been detected by the thresholding with the first threshold. More specifically, a range from a pixel P11 to the pixel P13 and a range from the pixel P14 to a pixel P15 are detected as the contour edges. As a result, the range from the pixel P13 to the pixel P15 on the contour candidate edge EL1 is determined as the contour edge. A range from the pixel P15 to the pixel P12 is not detected as a contour edge. Contour edges for the contour candidate edges EL21 and EL22 are detected in the same manner.

Thereafter, a contour edge image is obtained, in which a pixel value of each pixel is represented as flag information indicating whether the pixel is on the contour edge or not, in accordance with the following Equations (6) and (7). More specifically, the contour edge image is obtained, in which pixel values C(x, y) of pixels on the contour edge is set to "1" and pixels values C(x, y) of the other pixels are set to "0".

When a pixel is on the contour edge, $$C(x,y)=1 \quad (6)$$

Other than the above, $C(x,y)=0$ (7)

As an algorithm for specifically implementing the line-edge extraction processing (Step b5 of FIG. 5) and the contour-edge detection processing (Step a5 of FIG. 4) explained above, a known Canny edge detection algorithm may be used (see J. Canny, A Computational Approach to Edge Detection, IEEE Trans. on Pattern Analysis and Machine Intelligence, 8(6), pp. 679-698, 1986, or CG-ARTS society, Digital Image processing, p. 209—Contour detection).

Figure 7:
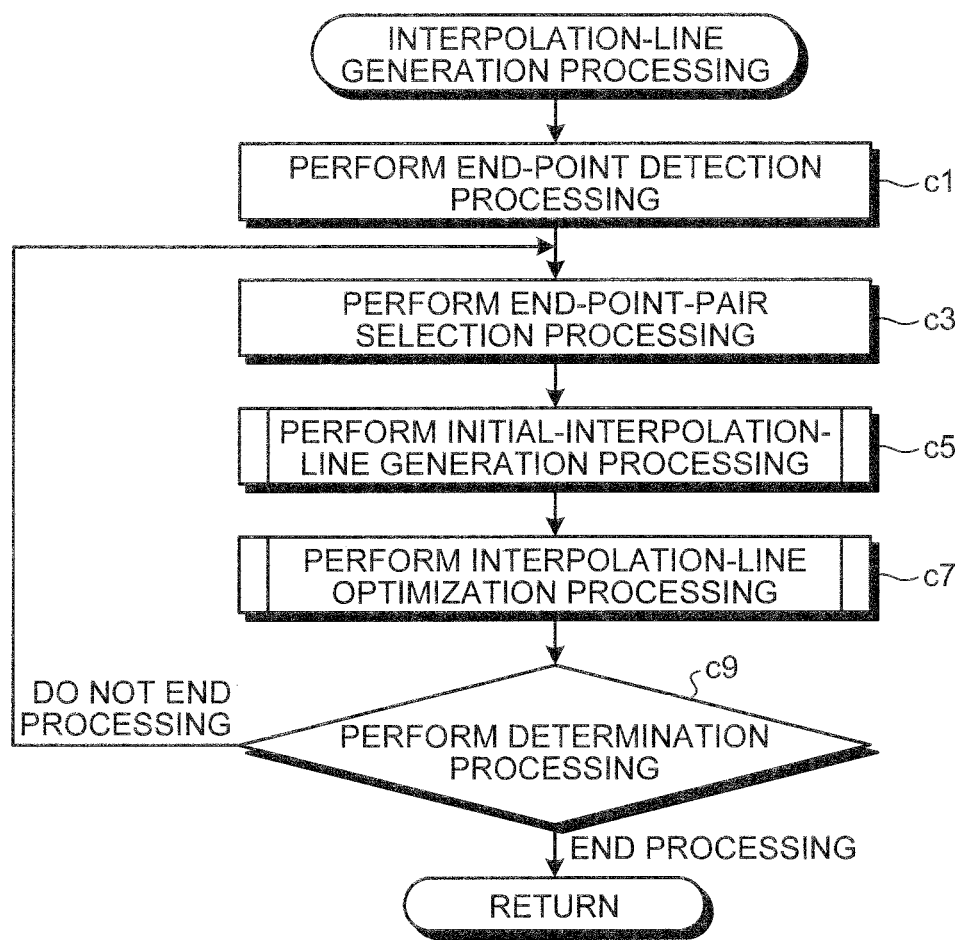
FIG. 7 is a flowchart of a detailed procedure of interpolation-line generation processing according to the first embodiment.

The interpolation-line generating unit 18 performs interpolation-line generation processing (Step a7). FIG. 7 is a flowchart of a detailed procedure of the interpolation-line generation processing according to the first embodiment. As illustrated in FIG. 7, in the interpolation-line generation processing, the end-point detecting unit 181 of the interpolation-line generating unit 18 performs end-point detection processing to detect end points of the contour edges (Step c1).

Figure 8:
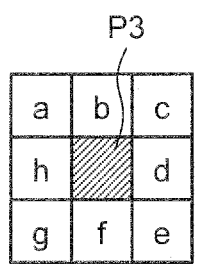
FIG. 8 is a diagram illustrating a pixel-of-interest and eight pixels near the pixel-of-interest.

In this example, pixels on the contour edges are sequentially looked at and a presence pattern of each pixel on the contour edge with respect to a surrounding area (for example, eight neighboring pixels) is determined in order to detect the end points of the contour edges. FIG. 8 is a diagram illustrating a pixel P3 that is to be looked at on the contour edge (a pixel-of-interest) and eight pixels near the pixel-of-interest P3. In the end-point detection processing, to distinguish the eight neighboring pixels around the pixel-of-interest P3 from one another, coordinates of the respective pixels are assumed as a, b, c, d, e, f, g, and h in a clockwise direction starting from an upper left corner as indicated in cells of the eight neighboring pixels in FIG. 8. When any of the eight neighboring pixels a to h is located on the contour edge (a condition 1), the pixel-of-interest P3 is determined as an end point. For example, when only the neighboring pixel a among the eight neighboring pixels a to h is located on the contour edge, the pixel-of-interest P3 is determined as an end point. The same is applied to each of the neighboring pixels b to h.

Furthermore, when adjacent two pixels among the neighboring pixels a to h are located on the contour edge (a condition 2), the pixel-of-interest P3 is determined as an end point. For example, when the two neighboring pixels a and b that are adjacent to each other among the eight neighboring pixels a to h are located on the contour edge, the pixel-of-interest P3 is determined as an end point. The same is applied to the following combinations of two adjacent pixels: [b, c], [c, d], [d, e], [e, f], [f, g], [g, h], and [h, a].

In actual processing, the end-point detecting unit 181 determines whether eight neighboring pixels around a pixel for which $C(x, y)=1$ satisfies the condition 1 or the condition 2 in accordance with the following Equations (8) and (9) on the basis of the contour edge image, thereby detecting end points of the contour edges.

Regarding a pixel for which $C(x, y)=1$, when the conditions 1 and 2 are satisfied, $$C(x,y)=2 \quad (8)$$

when the conditions 1 and 2 are not satisfied, $$C(x,y)=1 \quad (9)$$

$C(a)+C(b)+C(c)+C(d)+C(e)+C(f)+C(g)+C(h)=1$     Condition 1:

$C(a)+C(b)+C(c)+C(d)+C(e)+C(f)+C(g)+C(h)=2$; and     Condition 2:

$C(a)C(b)+C(b)C(c)+C(c)C(d)+C(d)C(e)+C(e)C(f)+C(f)C(g)+C(g)C(h)+C(h)C(a)=1$

In the above Equations (8) and (9), the condition 1 is set so that the sum of the pixel values $C(x, y)$ of the eight neighboring pixels a to h illustrated in FIG. 8 becomes "1". The condition 1 determines whether any of the eight neighboring pixels a to h is located at a contour edge position. Furthermore, the condition 2 is set so that the sum of the pixel values $C(x, y)$ of the eight neighboring pixels a to h becomes "2" and the sum of products of the pixel values $C(x, y)$ of adjacent two pixels becomes "1". The condition 2 determines whether the two adjacent pixels among the eight neighboring pixels are located at contour edge positions. The end-point detecting unit 181 makes setting so that a pixel that satisfies the condition 1 or the condition 2 at an end point is set such that $C(x, y)=2$ from among the pixels for which $C(x, y)=1$ at the contour edge positions, in accordance with Equation (8). Furthermore, the end-point detecting unit 181 maintains a pixel that does not satisfy the conditions 1 and 2 such that $C(x, y)=1$ from among the pixels for which $C(x, y)=1$, in accordance with Equation (9).

While the end points of the contour edges are detected in accordance with Equations (8) and (9), the detection method is not limited to this example. For example, it is possible to detect end points by matching or the like with use of a filter corresponding to a shape of end points (e.g., a presence pattern of pixels on the contour edge with regard to the pixel-of-interest P3 and the eight neighboring pixels a to h explained with reference to FIG. 8). Any methods capable of detecting end points of contour edges may be appropriately employed.

After the end points of the contour edges are detected as described above, the end-point-pair selecting unit 182 performs end-point-pair selection processing as illustrated in FIG. 7 (Step c3). In the end-point-pair selection processing, for an end point of a contour edge ($C(x, y)=2$; hereinafter, appropriately described as a "connection-base end point"), at least one end point to be a connection object (to which an interpolation line is drawn) is selected from among end points ($C(x, y)=2$) of other contour edges, and a combination of the connection-base end point and the end point of the other contour edge (hereinafter, appropriately described as a "connection-destination end point") that has been selected as the connection object for the connection-base end point is determined as an end-point pair. As will be explained later, when a sum of gradient costs at respective control points on an interpolation line that is generated for the end-point pair selected as above is greater than a threshold, it is determined that the processing at Step c9 is not performed, and therefore, the processing returns to Step c3. In this case, an end-point pair is re-selected by replacing the connection-destination end point for the end point of the contour edge (the connection-base end point) with an end point of another contour edge.

For example, in (a) of FIG. 6, when the pixel P15, which is one end point of a contour edge detected from the contour candidate edge EL1, is focused on, an end point P21 of a contour edge detected from the contour candidate edge EL21 or an end point P22 of a contour edge detected from the contour candidate edge EL22 is selected as the connection-destination end point.

In actual processing, for example, a distance from the connection-base end point or a gradient change direction at the connection-base end point is used as a parameter, and end points of contour edges other than the connection-base end point are selected one by one as the connection-destination end point on the basis of a value of the parameter every time the processing at Step c3 is performed. For example, when the distance from the connection-base end point is used as a parameter, end points ($C(x, y)=2$) of contour edges that are present within a predetermined distance from the connection-base end point in all directions of the connection-base end point are sequentially selected in order from the nearest, as the connection-destination end point. Furthermore, when both of the distance from the connection-base end point and the gradient change direction of the connection-base end point are used as two parameters, end points, which are located within a radius from a center point located on a direction perpendicular to the gradient change direction at the connection-base end point and of which gradient change directions are oriented in the direction perpendicular to the gradient change direction of the connection-base end point or oriented in the directions close to the perpendicular direction, are sequentially selected as the connection-destination end point from among the end points ($C(x, y)=2$) of the contour edge, in order from the nearest to the connection-base end point. It is also possible to use only the gradient change direction at the connection-base end point as a parameter to select the connection-destination end point.

The initial-interpolation-line generating unit 183 performs initial-interpolation-line generation processing by sequentially handling the end-point pairs selected at Step c3 as an object-of-interest, and generates an initial interpolation line for connecting the connection-base end point and the connection-destination end point for each of the end-point pairs (Step c5).

Figure 9:
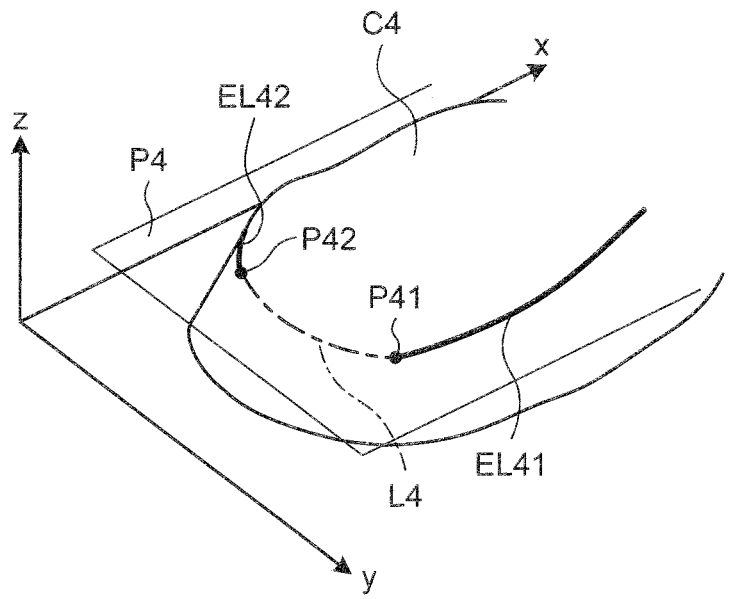
FIG. 9 is a diagram explaining a principle of generation of an initial interpolation line.
Figure 10:
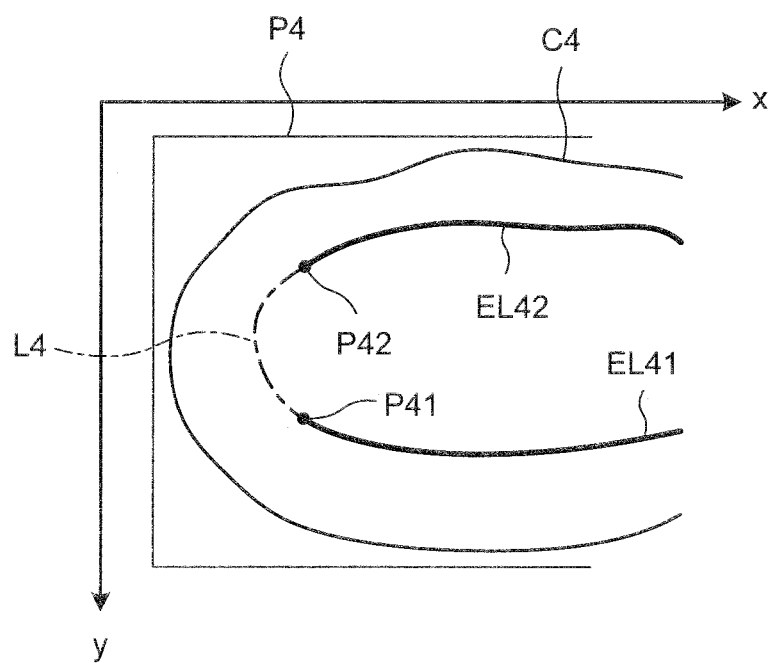
FIG. 10 is another diagram explaining the principle of the generation of the initial interpolation line.
Figure 11:
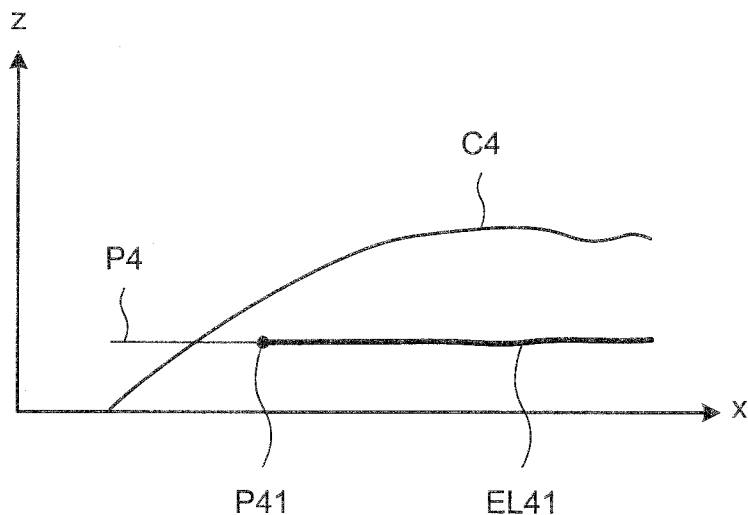
FIG. 11 is still another diagram explaining the principle of the generation of the initial interpolation line.

FIGS. 9 to 11 are diagrams explaining a principle of generation of the initial interpolation line when an end-point pair being the object-of-interest is focused on. FIG. 9 illustrates an approximate curved surface C4 obtained by approximation of a change in pixel values of respective pixels in the intraluminal image. In the figure, a connection-base end point P41 of a contour edge EL41 and a connection-destination end point P42 on a contour edge EL42, which form the end-point pair as the object-of-interest, are illustrated at corresponding positions (z positions) on the approximate curved surface C4.

FIG. 10 is a plan view of the approximate curved surface C4 illustrated in FIG. 9, when viewed from the z-axis direction. FIG. 11 is a side view of the approximate curved surface C4 illustrated in FIG. 9, when viewed from the Y-axis direction.

As illustrated in FIGS. 9 to 11, in the initial-interpolation-line generation processing, the approximate curved surface C4 obtained by approximation of a change in the pixel values is generated on the basis of the pixel values of the respective pixels in the intraluminal image. Then, an intersecting line between a plane P4, which contains the connection-base end point P41 and the connection-destination end point P42 that are the end-point pair being the object-of-interest (details of the plane P4 will be described later with reference to FIG. 13), and the approximate curved surface C4 is obtained, and a line segment connecting the connection-base end point P41 and the connection-destination end point P42 on the intersecting line as indicated by a chain line in FIGS. 9 and 10 are generated as an initial interpolation line L4.

Figure 12:
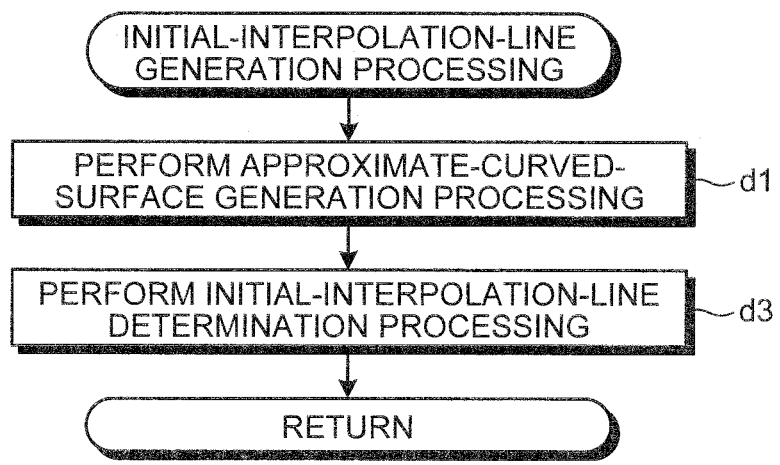
FIG. 12 is a flowchart of a detailed procedure of initial-interpolation-line generation processing according to the first embodiment.

FIG. 12 is a flowchart of a detailed procedure of the initial-interpolation-line generation processing according to the first embodiment. As illustrated in FIG. 12, in the initial-interpolation-line generation processing, the approximate-curved-surface generating unit 184 of the initial-interpolation-line generating unit 183 performs approximate-curved-surface generation processing to generate an approximate curved surface by approximating a change in the pixel values on the basis of the pixel values in the intraluminal image (Step d1). In this example, the approximate curved surface is generated by performing, for example, low-pass filter processing on the intraluminal image. More specifically, discrete cosine transform (DCT) is performed to construct the approximate curved surface by using only a low-dimensional basis. The number of bases to be used is set so that a difference in a luminance value between the generated approximate curved surface and the intraluminal image becomes equal to or smaller than a predetermined threshold. The method of generating the approximate curved surface is not limited to this example. For example, it is possible to generate the approximate curved surface by performing function approximation by using a least-square method. The function approximation using the least-square method is well-known as a method of calculating plausible coefficients of a polynomial for indicating a data distribution (a distribution of the pixel values of the respective pixels in the intraluminal image).

Figure 13:
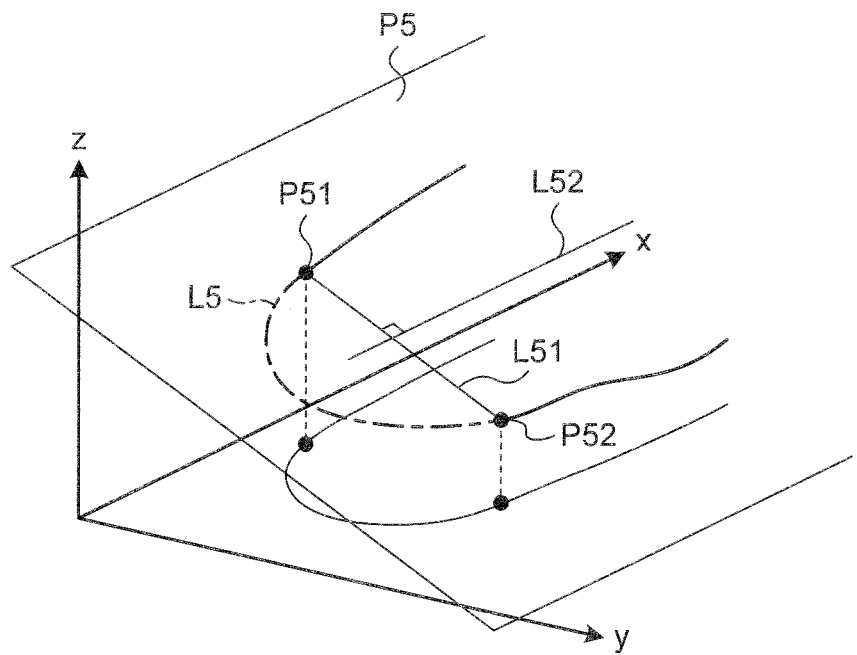
FIG. 13 is a diagram explaining an initial-interpolation-line determination processing.

The initial-interpolation-line determining unit 185 performs initial-interpolation-line determination processing to determine an initial path of an interpolation line (an initial interpolation line) for connecting the connection-base end point and the connection-destination end point as the end-point pair being the object-of-interest (Step d3). FIG. 13 is a diagram explaining the initial-interpolation-line determination processing. In the figure, a connection-base end point P51 and a connection-destination end point P52, as the end-point pair being the object-of-interest, are illustrated at corresponding positions (z positions) on the approximate curved surface generated at Step d1 of FIG. 12. In FIG. 13, illustration of the approximate curved surface is omitted. In the initial-interpolation-line determination processing, as a plane containing the connection-base end point P51 and the connection-destination end point P52 that form the end-point pair being the object-of-interest, a plane P5 is determined that is perpendicular to a straight line L51 passing through the connection-base end point P51 and the connection-destination end point P52 (more specifically, a straight line passing through positions (z positions) that are on the approximate curved surface and that correspond to the coordinates (x, y) of the connection-base end point P51 and the connection-destination end point P52) and that contains a straight line L52 that is parallel to an x-y plane being a plane of coordinates of the intraluminal image. Then, an intersecting line between the determined plane P5 and the approximate curved surface generated at Step d1 of FIG. 12 is obtained, and a line segment connecting the connection-base end point P51 and the connection-destination end point P52 on the intersecting line as indicated by a chain line in FIG. 13 is generated as an initial interpolation line L5. More specifically, coordinates (x, y) of respective pixels on the initial interpolation line L5 indicated by the chain line are determined as pixels on the initial interpolation line.

In the above example, the initial interpolation line is generated by generating the approximate curved surface that is obtained by approximation of a change in the pixel values of the respective pixels in the intraluminal image. However, the method of generating the initial interpolation line is not limited to this example. For example, it is possible to determine a straight line connecting end points as an end-point pair (between a connection-base end point and a connection-destination end point) as the initial interpolation line. It is also possible to connect end points as an end-point pair by an approximate curve, such as a Bezier curve, and sets the approximate curve as the initial interpolation line. After the initial interpolation line is generated for the end-point pair being the object-of-interest in the above-described manner, the processing returns to Step c5 of FIG. 7 and then proceeds to Step c7.

Figure 14:
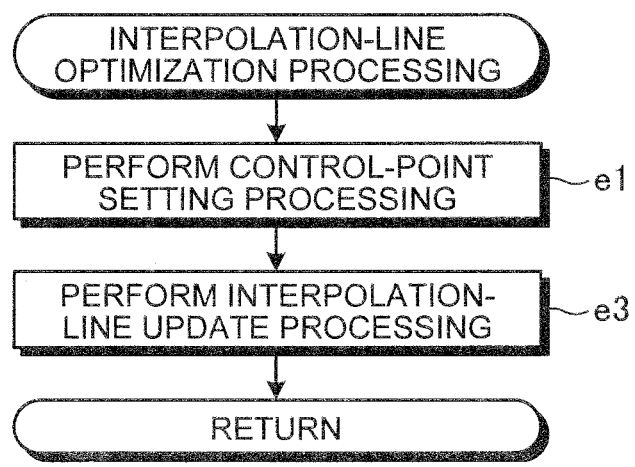
FIG. 14 is a flowchart of a detailed procedure of interpolation-line optimization processing according to the first embodiment.
Figure 15:
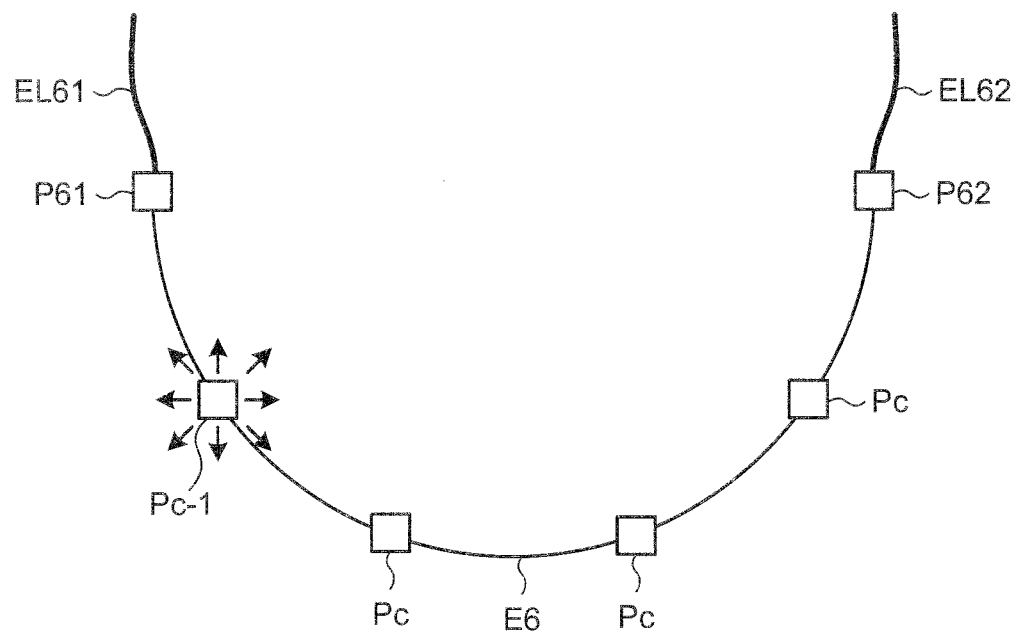
FIG. 15 is a diagram explaining an initial-interpolation-line optimization processing.

At Step c7, the interpolation-line optimizing unit 186 performs interpolation-line optimization processing by sequentially handles the end-point pairs, which have been selected at Step c3, as an object-of-interest, and optimizes the initial interpolation lines for connecting end points of all end-point pairs. As described above, according to the first embodiment, the active contour model (snake) is used to optimize the initial interpolation line so that the gradient cost becomes the smallest. FIG. 14 is a flowchart of a detailed procedure of the interpolation-line optimization processing according to the first embodiment. FIG. 15 is a diagram explaining an initial-interpolation-line optimization processing. In the figure, a connection-base end point P61 of a contour edge EL61 and a connection-destination end point P62 of a contour edge EL62, which form an end-point pair of an object-of-interest, are illustrated as well as an initial interpolation line E6 that connects the above points.

As illustrated in FIG. 14, in the interpolation-line optimization processing, the control-point setting unit 187 of the interpolation-line optimizing unit 186 performs control-point setting processing to set a plurality of control points at regular intervals on the initial interpolation line that connects end points being an end-point pair of an object-of-interest (Step e1). For example, in the example of FIG. 15, four control points Pc are set at regular intervals on an initial interpolation line E6.

The interpolation-line updating unit 188 performs interpolation-line update processing (Step e3). For example, the interpolation-line updating unit 188 calculates a gradient cost for each control point by using a value of a gradient magnitude at each of the control points set at Step e1 and moves the control points so that the sum of the calculated gradient costs is reduced, thereby updating the initial interpolation line. For example, as indicated by arrows around a control point Pc-1 in FIG. 15, each of the control points Pc is moved in any of eight directions around the control point to thereby update the initial interpolation line E6. When the initial interpolation line E6 is to be updated, both ends are not moved but fixed at the positions of the connection-base end point P61 and the connection-destination end point P62.

Calculation of the gradient cost is explained below. First, a direction of a contour edge at the position of each of the control points Pc is obtained. The direction of the contour edge is obtained through calculation using a tangent (tan θ) of an angle (−90°≤θ<90°) with the horizontal direction set to 0°, on the basis of information on the contour edge around the position of each control point Pc (for example, eight neighboring pixels).

For example, it is assumed that the pixel-of-interest P3 illustrated in FIG. 8 is located at the position of a control point Pc. It is also assumed that two neighboring pixels h and d among the eight neighboring pixels a to h are determined as being located on the contour edge on the basis of the information on the contour edge. In this case, the direction (θ(p3)) of the control edge at the control point Pc being the pixel-of-interest P3 is obtained such that θ(p3)=0° in accordance with the following Equation (10). x(h) and x(d) represent x coordinates of the neighboring pixels h and d, respectively, and y(h) and y(d) represent y coordinates of the neighboring pixels h and d, respectively.

$$\theta(P3) = \arctan\left(\frac{abs(y(h) - y(d))}{abs(x(h) - x(d))}\right) \quad (10)$$

Similarly, when two neighboring pixels g and d are determined as being located on the contour edge on the basis of the information on the contour edge, the direction (θ(p3)) of the contour edge at the control point Pc being the pixel-of-interest P3 is obtained such that θ(p3)=135° in accordance with the following Equation (11). x(g) and x(d) represent x coordinates of the neighboring pixels g and d, respectively, and y(g) and y(d) represent y coordinates of the neighboring pixels g and d, respectively.

$$\theta(P3) = \arctan\left(\frac{abs(y(g) - y(d))}{abs(x(g) - x(d))}\right) \quad (11)$$

Also, a gradient change direction of each of the control points Pc is calculated in accordance the above-described Equation (1). Then, a difference between the direction of the contour edge and the gradient change direction is calculated, and a gradient cost is calculated so that the value of the gradient cost decreases as the difference increases and the value of the gradient cost increases as the difference decreases. For example, an inverse of the difference is calculated and set as the value of the gradient cost.

When the sum of the gradient costs obtained after the control points are moved and the path is updated is greater than the sum of the gradient costs obtained before the update, and if the sum of the gradient costs obtained after the update does not change even when the update is repeated, the interpolation-line updating unit 188 determines that the optimization of the initial path of the interpolation line is complete and ends the processing at Step e3. Accordingly, the processing returns to Step c7 of FIG. 7 and then proceeds to Step c9.

At Step c9, the interpolation-line generating unit 18 performs determination processing, for each of the end-point pairs selected at Step c3, to determine whether the sum of the gradient costs of the control points on the interpolation line optimized by the interpolation-line optimization processing at Step c7 is equal to or smaller than a predetermined threshold, thereby determining whether to end the processing. An end-point pair, for which the sum of the gradient costs is greater than the threshold, should not be connected, so that when there is an end-point pair for which the sum of the gradient costs is greater than the threshold, it is determined that the processing is not complete. Accordingly, the processing returns to Step c3 and the above-mentioned processing is repeated. At Step c3 at this time, an end-point pair is re-selected by changing the connection-destination end point for the connection-base end point of the end-point pair that has been determined that the sum is greater than the threshold. Thereafter, the processing from Step c5 is performed on the selected end-point pair.

On the other hand, when the sum of the gradient costs for each of the end-point pairs is equal to or smaller than the threshold, the processing ends. In this case, the followings are determined as an interpolated contour edge for each end-point pair: a contour edge having an end point being the connection-base end point, a contour edge having an end point being the connection-destination end point, and an optimized interpolation line that connects the connection-base end point and the connection-destination end point. Then, an interpolated contour edge image is obtained, in which a pixel value of each pixel is represented as flag information indicating whether the pixel is on the interpolated contour edge or not. More specifically, the interpolated contour edge image is obtained, in which pixel values of pixels on the generated interpolated contour edge are set to "1" and pixels values of the other pixels are set to "0". Thereafter, the processing returns to Step a7 of FIG. 4 and then proceeds to Step a9.

At Step a9, the arithmetic unit 15 performs interpolated-contour-edge-image output processing to output the interpolated-contour-edge image, which has been obtained through the interpolation-line generation processing at Step a7, to the recording unit 14 for storing the image.

As described above, according to the first embodiment, an end-point pair is selected by setting an end point of a contour edge as a connection-base end point and setting an end point of another contour edge as a connection-destination end point. Then, an initial path of an interpolation line that connects the end points being the end-point pair is optimized so that the cost value of gradients (gradient cost) of pixel values of respective pixels on the interpolation line becomes the smallest, whereby an interpolation line is generated. Therefore, it is possible to generate an interpolation line that connects the end points being an end-point pair along a contour shape of a mucosal structure. Consequently, it is possible to appropriately select an end point of a contour edge that needs to be connected to an end point of a contour edge set as the connection-base end point, and it is also possible to appropriately interpolate discontinuity between the connection-base end point and the connection-destination end point with the generated interpolation line. As a result, it is possible to appropriately connect a discontinued contour edge.

First Modification

Figure 16:
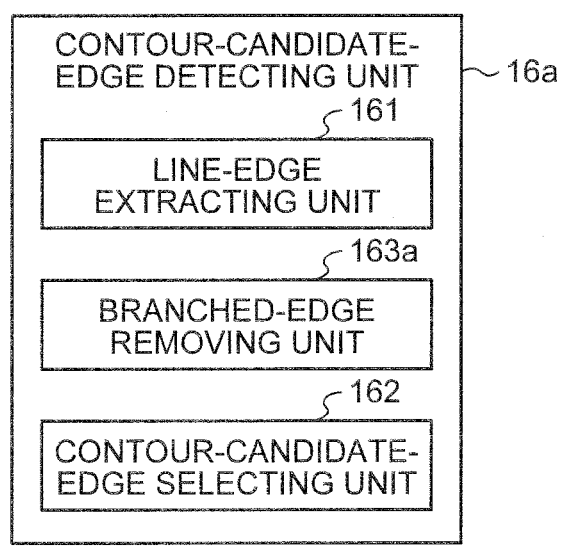
FIG. 16 is a block diagram of a configuration example of a contour-candidate-edge detecting unit according to a first modification of the first embodiment.

FIG. 16 is a block diagram of a configuration example of a contour-candidate-edge detecting unit 16a according to a first modification of the first embodiment. An image processing apparatus of the first modification can be constructed by replacing the contour-candidate-edge detecting unit 16 of FIG. 1 with the contour-candidate-edge detecting unit 16a of FIG. 16. In FIG. 16, the same components as those of the first embodiment are denoted by the same reference codes. As illustrated in FIG. 16, according to the first modification, the contour-candidate-edge detecting unit 16a includes the line-edge extracting unit 161, a branched-edge removing unit 163a, and the contour-candidate-edge selecting unit 162.

The branched-edge removing unit 163a removes line edge portions branched from a line edge extracted by the line-edge extracting unit 161. According to the first modification, the contour-candidate-edge selecting unit 162 selects an edge portion formed of pixels that are contained in an area other than the flat area among pixels on the line edge from which the branched edges have been removed by the branched-edge removing unit 163a.

The first modification is different from the first embodiment in terms of the contour-candidate-edge detection processing at Step a3 in the overall flowchart of FIG. 4. FIG. 17 is a flowchart of a detailed procedure of contour-candidate-edge detection processing according to the first modification. In FIG. 17, the same processing processes as those of the first embodiment are denoted by the same reference codes.

Figure 18A:
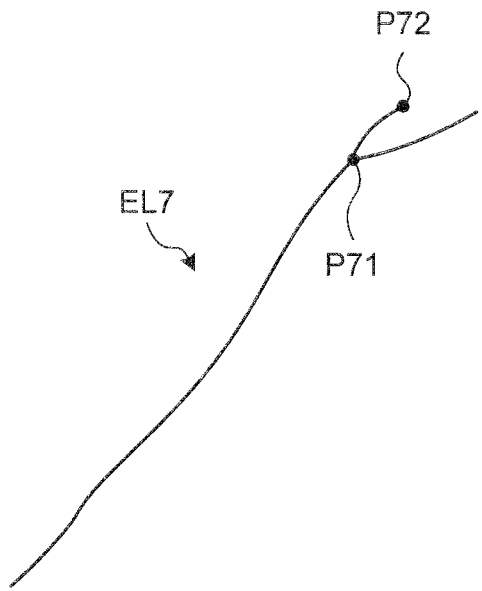
FIG. 18 is a diagram explaining a branched-edge removal processing.
Figure 18B:
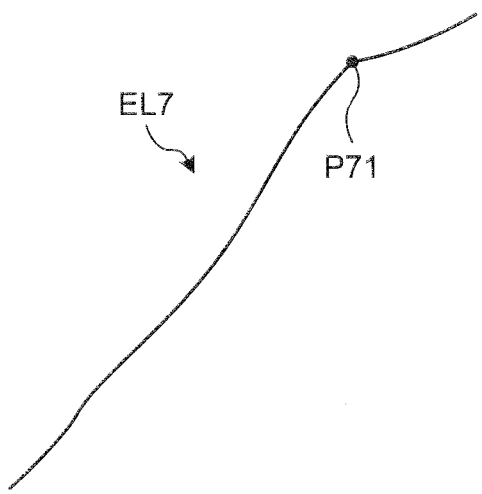

As illustrated in FIG. 17, according to the first modification, after the line-edge extracting unit 161 extracts line edges, the branched-edge removing unit 163a performs branched-edge removal processing (Step f6). FIG. 18 is a diagram explaining the branched-edge removal processing. In (a) of FIG. 18, a line edge EL7 extracted at Step b5 of FIG. 17 is illustrated. In the branched-edge removal processing, an end point of the extracted line edge is detected, and a branch point of the line edge is also detected. When a length from the branch point to the end point is shorter than a predetermined length, a line edge portion from the branch point to the end point is removed from the line edge. For example, as illustrated in (a) of FIG. 18, it is assumed that the line edge EL7 extracted at Step f6 of FIG. 17 is branched, and a length from a branch point P71 to an end point P72 is shorter than a predetermined length. In this case, a line edge portion from the branch point P71 to the end point P72 is removed from the line edge EL7 ((b) of FIG. 18). After the branched-edge removal processing is performed, the processing from Step b7 is performed in the same manner as the first embodiment.

Second Modification

Figure 19:
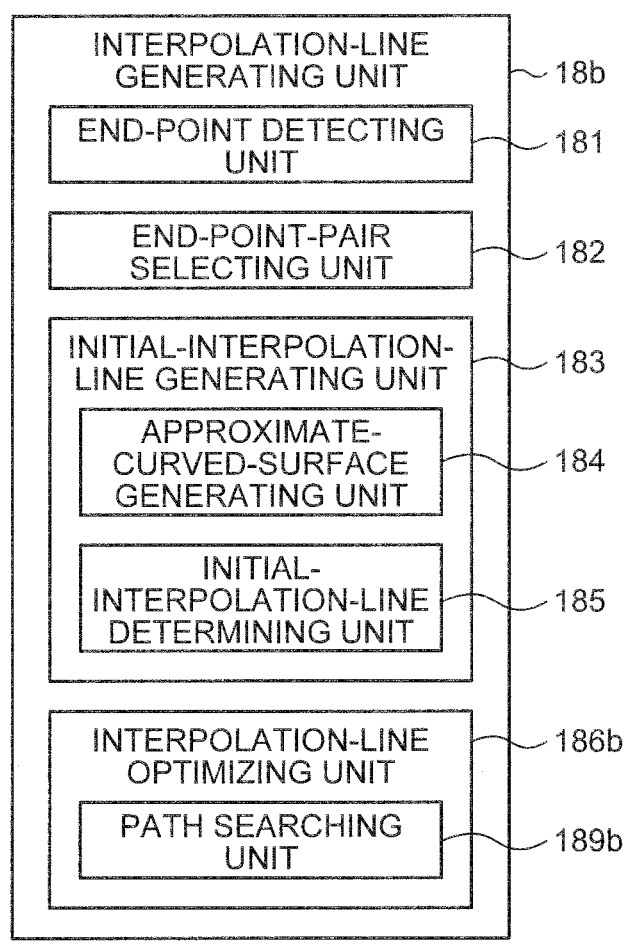
FIG. 19 is a block diagram of a configuration example of an interpolation-line generating unit according to a second modification.

FIG. 19 is a block diagram of a configuration example of an interpolation-line generating unit 18b according to a second modification of the first embodiment. An image processing apparatus of the second modification can be realized by replacing the interpolation-line generating unit 18 of FIG. 1 with the interpolation-line generating unit 18b of FIG. 19. In FIG. 19, the same components as those of the first embodiment are denoted by the same reference codes. As illustrated in FIG. 19, according to the second modification, the interpolation-line generating unit 18b includes the end-point detecting unit 181, the end-point-pair selecting unit 182, the initial-interpolation-line generating unit 183, and an interpolation-line optimizing unit 186b. According to the second modification, the interpolation-line optimizing unit 186b includes a path searching unit 189b.

The second modification is different from the first embodiment in that path search processing is performed instead of the interpolation-line optimization processing at Step c7 in the interpolation-line generation processing of FIG. 7. In the path search processing, the path searching unit 189b sequentially handles the end-point pairs as an object-of-interest and searches for a path for which a value of a gradient cost becomes the smallest by using a path search algorithm, on the basis of the initial path of an interpolation line that connects end points as an end-point pair being the object-of-interest.

As the path search algorithm, for example, a genetic algorithm and an A-star algorithm is known, and either one of the path search algorithms can be used. For example, the genetic algorithm is an algorithm for performing evolutionary computation by using a population of individuals in a certain generation as a base unit. In the genetic algorithm, an initial population is first generated and an individual is selected from the initial population. Then, crossover or mutation is performed on the selected individual to generate a next generation population. Thereafter, the processing is repeated on the next generation population to eventually select an individual that is highly adaptive. When the genetic algorithm is used, as a chromosome of a gene that characterizes each individual, a combination of directional components of the gradient magnitude of each pixel on the interpolation line (a lateral (right-left) component and a longitudinal (top-bottom) component of the gradient magnitude calculated at Step b3 of FIG. 5) is used for example. As an evaluation value, a gradient cost (a sum of the gradient costs of respective pixels on the interpolation line) is used.

Second Embodiment

A configuration of an image processing apparatus according to a second embodiment will be described. FIG. 20 is a block diagram of a functional configuration example of an image processing apparatus 1c according to the second embodiment. FIG. 21 is a block diagram of a configuration example of a contour-edge interpolating unit 19c included in an arithmetic unit 15c. The same components as those explained in the first embodiment are denoted by the same reference codes. As illustrated in FIG. 20, the image processing apparatus 1c of the second embodiment includes the external I/F unit 11, the operating unit 12, the display unit 13, a recording unit 14c, the arithmetic unit 15c, and the control unit 20 that controls the whole operation of the image processing apparatus 1c.

In the recording unit 14c, an image processing program 141c is recorded that implements processing according to the second embodiment in order to detect contour edges of a mucosal structure or the like from an intraluminal image and connect discontinued contour edges.

The arithmetic unit 15c includes the contour-candidate-edge detecting unit 16, the contour-edge detecting unit 17, an interpolation-line generating unit 18c, and the contour-edge interpolating unit 19c. The contour-candidate-edge detecting unit 16, the contour-edge detecting unit 17, the interpolation-line generating unit 18c, and the contour-edge interpolating unit 19c are connected to one another in this order.

The interpolation-line generating unit 18c is structured in the same manner as the first embodiment. As explained above with reference to FIG. 3, the interpolation-line generating unit 18c includes the end-point detecting unit 181; the end-point-pair selecting unit 182; the initial-interpolation-line generating unit 183 that includes the approximate-curved-surface generating unit 184 and the initial-interpolation-line determining unit 185; and the interpolation-line optimizing unit 186 that includes the control-point setting unit 187 and the interpolation-line updating unit 188. The interpolation-line generating unit 18c of the second embodiment generates a plurality of interpolation lines for connecting a plurality of connection-destination end points to an end point being a connection-base end point of a contour edge. The interpolation-line generating unit 18c outputs the interpolation lines that are generated for each connection-base end point to the contour-edge interpolating unit 19c.

The contour-edge interpolating unit 19c selects one of the interpolation lines that have been generated for each connection-base end point by the interpolation-line generating unit 18c, and interpolates a contour edge between the corresponding end points being an end-point pair with the selected interpolation line. The contour-edge interpolating unit 19c includes, as illustrated in FIG. 21, a gradient-cost acquiring unit 191*c*, an interpolation-line selecting unit 192*c*, and an interpolation-contour-edge forming unit 193*c*.

The gradient-cost acquiring unit 191*c* acquires gradient costs of the respective interpolation lines that are input by the interpolation-line generating unit 18*c* for each connection-base end point. The interpolation-line selecting unit 192*c* selects one of the interpolation lines for each connection-base end point on the basis of the gradient costs acquired by the gradient-cost acquiring unit 191*c*. The interpolation-contour-edge forming unit 193*c* generates an interpolated contour edge by using the selected interpolation line and the contour edges, one of which has an end point as the connection-base end point and the other of which has an end point as the connection-destination end point as an end-point pair to be connected by the selected interpolation line, in accordance with the interpolation line selected for each connection-base end point.

Figure 22:
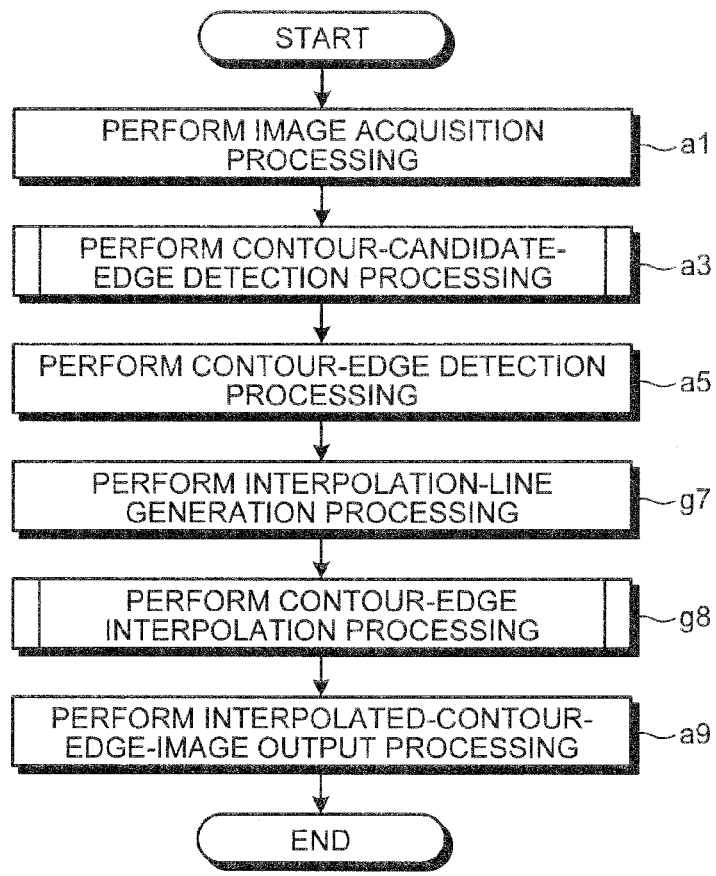
FIG. 22 is an overall flowchart of a procedure of processing performed by the image processing apparatus according to the second embodiment.

FIG. 22 is an overall flowchart of a procedure of processing performed by the image processing apparatus 1*c* according to the second embodiment. The processing explained below is implemented by causing the units of the image processing apparatus 1*c* to operate in accordance with the image processing program 141*c* recorded in the recording unit 14*c*. In FIG. 22, the same processing processes as those of the first embodiment are denoted by the same reference codes.

As illustrated in FIG. 22, according to the second embodiment, after the contour-edge detecting unit 17 performs the contour-edge detection processing at Step a5 to detect contour edges, the interpolation-line generating unit 18*c* performs interpolation-line generation processing (Step g7). A processing procedure of the interpolation-line generation processing is the same as the first embodiment (see FIG. 7). However, according to the second embodiment, in the end-point-pair selection processing at Step c3 of FIG. 7, a plurality of end points (C(x, y)=2) of different contour edges is selected as the connection-destination end points for each end point (C(x, y)=2) being the connection-base end point, so that a plurality of end-point pairs is generated for each connection-base end point.

When the connection-destination end points are selected, and if a distance to the connection-base end point is used as a parameter, end points (C(x, y)=2) of all contour edges within a predetermined distance from the connection-base end point are selected as the connection-destination end points. When the distance from the connection-base end point and the gradient change direction of the connection-base end point are used as two parameters, end points (C(x, y)=2) of all contour edges in a predetermined angular range with a center point located on a direction perpendicular to the gradient change direction at the connection-base end point are selected as the connection-destination end points from among end points (C(x, y)=2) of contour edges located within a predetermined distance from the connection-base end point. When only the gradient change direction of the connection-base end point is used as a parameter, end points (C(x, y)=2) of all contour edges in a predetermined angular range with a center point located on a direction perpendicular to the gradient change direction of the connection-base end point are selected as the connection-destination end points.

Thereafter, the end-point pairs generated for each connection-base end point are sequentially handled as an object-of-interest, and the initial-interpolation-line generation processing (Step c5 of FIG. 7), the interpolation-line optimization processing (Step c7 of FIG. 7), and the determination processing (Step c9) are sequentially performed on each end-point pair in the same manner as the first embodiment. As a result of the interpolation-line generation processing, a plurality of interpolation lines for connecting the end-point pairs is generated for each connection-base end point.

Figure 23:
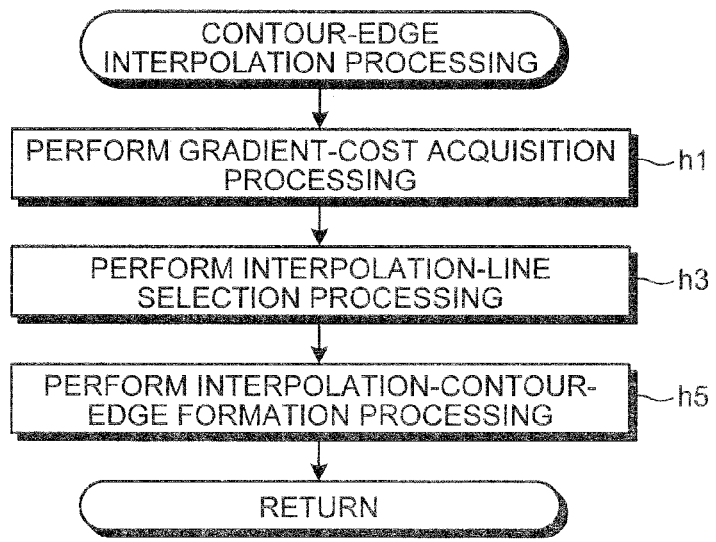
FIG. 23 is a flowchart of a detailed procedure of contour-edge interpolation processing according to the second embodiment.

After the interpolation-line generation processing is performed as described above, as illustrated in FIG. 22, the contour-edge interpolating unit 19*c* sequentially handles the connection-base end points, for each of which the end-point pairs have been selected at Step g7, as an object-of-interest, in order to perform contour-edge interpolation processing on all of the connection-base end points (Step g8). FIG. 23 is a flowchart of a detailed procedure of the contour-edge interpolation processing according to the second embodiment.

As illustrated in FIG. 23, in the contour-edge interpolation processing, the gradient-cost acquiring unit 191*c* of the contour-edge interpolating unit 19*c* performs gradient-cost acquisition processing (Step h1). In the gradient-cost acquisition processing, the gradient-cost acquiring unit 191*c* sets a plurality of reference points on each of the interpolation lines generated at Step g7 of FIG. 22 for the connection-base end point being the object-of-interest, and acquires a value of the gradient cost at each reference point. At this time, the same number of the reference points are set on each of the interpolation lines at, for example, regular intervals. The value of the gradient cost at each reference point is calculated in the same manner as the first embodiment (see the explanation for Step e3 of FIG. 14). Thereafter, the sum of the gradients costs of the respective reference points is calculated for each interpolation line.

The interpolation-line selecting unit 192*c* performs interpolation-line selection processing to select one of the interpolation lines generated at Step g7 of FIG. 22 for the connection-base end point being the object-of-interest (Step h3). In the interpolation-line selection processing, the interpolation-line selecting unit 192*c* selects an interpolation line, of which sum of the gradient costs is the smallest and is equal to or smaller than a predetermined threshold, from among the interpolation lines on the basis of the sum of the gradient costs calculated for each interpolation line at Step h1.

The interpolation-contour-edge forming unit 193*c* performs interpolation-contour-edge formation processing (Step h5). In the interpolation-contour-edge formation processing, the interpolation-contour-edge forming unit 193*c* generates an interpolated contour edge by using the interpolation line, which has been selected at Step h3 for the connection-base end point being the object-of-interest, a contour edge having an end point as the connection-base end point being the object-of-interest, and a contour edge having an end point as the connection-destination end point to be connected to the connection-base end point being the object-of-interest with the selected interpolation line.

As described above, according to the second embodiment, a plurality of different connection-destination end points is selected for an end point being a connection-base end point of a contour edge in order to generate a plurality of end-point pairs, and interpolation lines for connecting the respective end-point pairs is generated. Then, one of the generated interpolation lines is selected on the basis of the cost values of gradients (the gradient costs) of the pixel values of pixels on the interpolation lines, and an interpolated contour edge is generated on the basis of the selected interpolation line, a contour edge having an end point as the connection-base end point to be connected with the selected interpolation line, and a contour edge having an end point as the connection-destination end point to be connected with the selected interpolation line. Therefore, it is possible to achieve the same advantages as those of the first embodiment. Consequently, it is possible to appropriately select an end point of a contour edge to be connected to an end point of another contour edge as a connection-base end point, and it is also possible to appropriately interpolate discontinuity between the connection-base end point and the connection-destination end point with the interpolation line. As a result, it is possible to appropriately connect discontinued contour edges.

In the first and the second embodiments described above, two end points among end points of contour edges are selected as an end-point pair, and an interpolation line for connecting the selected end points being the end-point pair is generated. However, it is possible to select two end points as an end-point pair from among end points of contour candidate edges. It is also possible to select one of end points of contour edges and one of end points of contour candidate edges as an end-point pair. In this case, the end point of contour candidate edge is calculated in the same manner as the calculation of an end point of a contour edge.

The image processing apparatus 1 of the first embodiment and the image processing apparatus 1c of the second embodiment may be realized by causing a computer system, such as a personal computer or a workstation, to execute a computer program that is prepared in advance. In the following, a computer system that has the same functions as those of the image processing apparatus 1 or 1c of each of the first and the second embodiments and that executes the image processing program 141 or 141c will be explained below.

Figure 24:
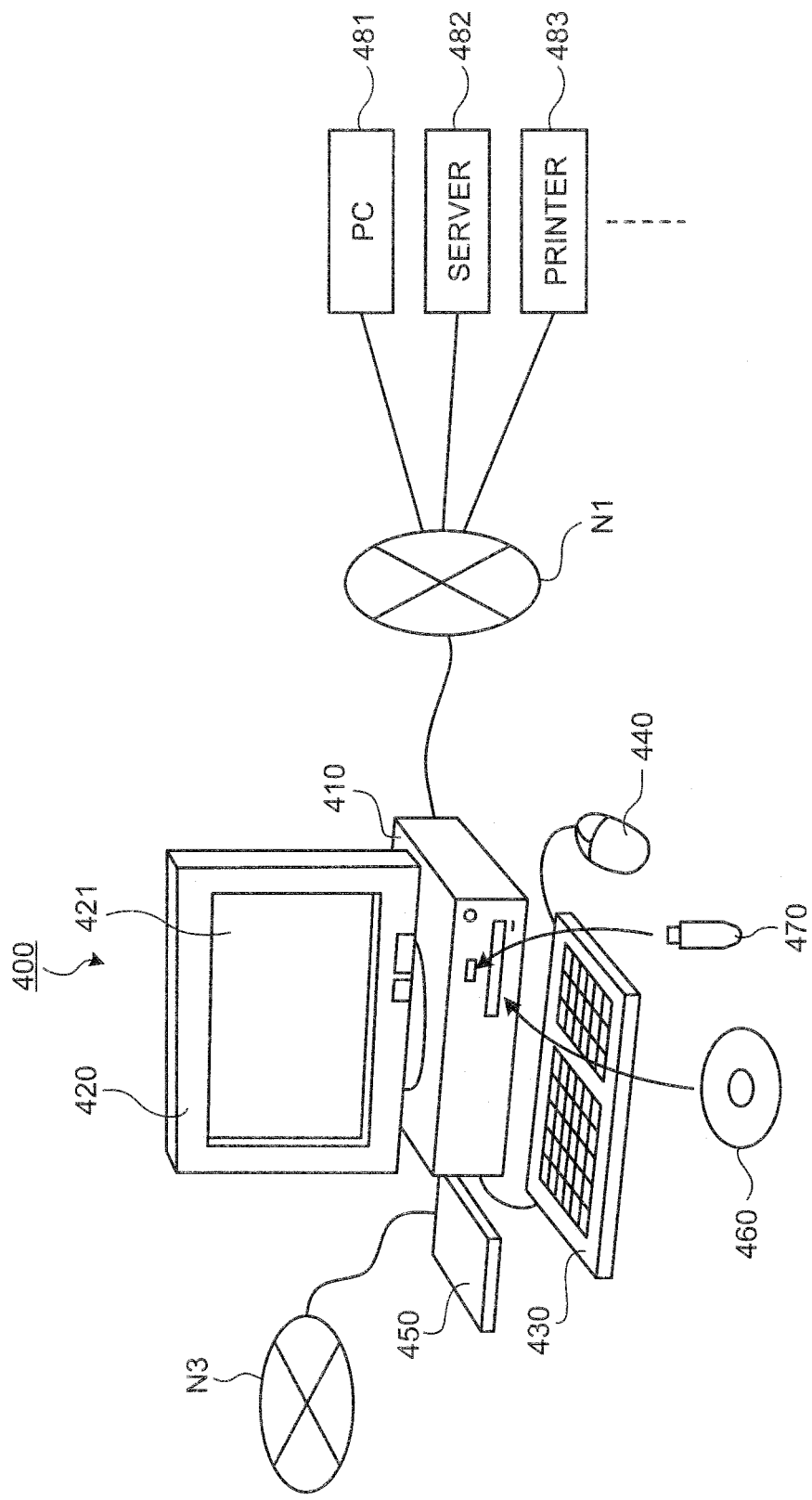
FIG. 24 is a system configuration diagram of a computer system to which the present invention is applied.
Figure 25:
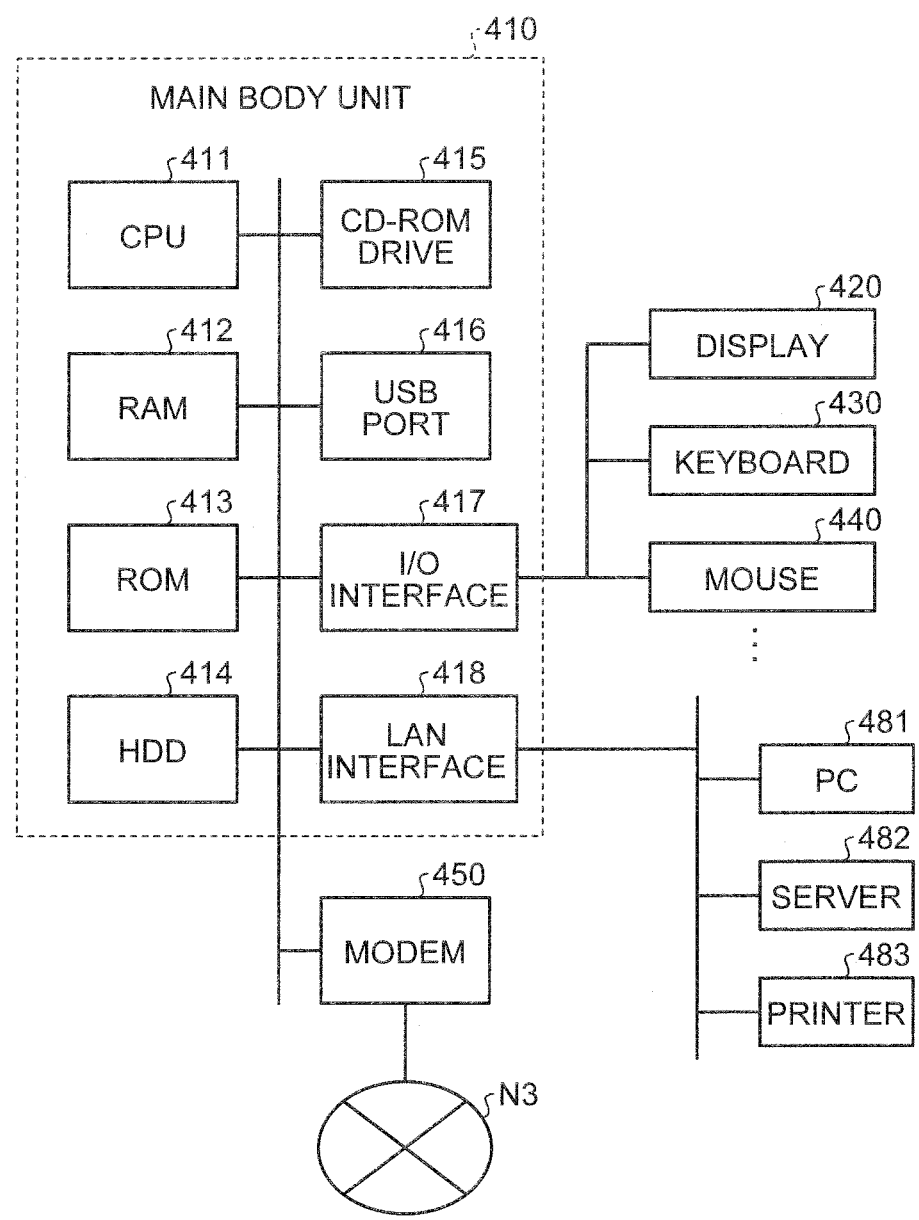
FIG. 25 is a block diagram of a configuration of a main body unit of the computer system illustrated in FIG. 24.

FIG. 24 is a system configuration diagram of a computer system 400 to which the present invention is applied. FIG. 25 is a block diagram of a configuration of a main body unit 410 of the computer system 400. As illustrated in FIG. 24, the computer system 400 includes the main body unit 410; a display 420 for displaying information, such as an image, on a display screen 421 in response to an instruction from the main body unit 410; a keyboard 430 for inputting various types of information on the computer system 400; and a mouse 440 for specifying any positions on the display screen 421 of the display 420.

As illustrated in FIGS. 24 and 25, the main body unit 410 of the computer system 400 includes a CPU 411; a RAM 412; a ROM 413; a hard disk drive (HDD) 414; a CD-ROM drive 415 for receiving a CD-ROM 460; a USB port 416 for detachably connects a USB memory 470; an I/O interface 417 for connecting the display 420, the keyboard 430, and the mouse 440; and a LAN interface 418 for connecting to a local area network or a wide area network (LAN/WAN) N1.

The computer system 400 is connected to a modem 450 for connecting to a public line N3, such as the Internet. Also, the computer system 400 is connected to other computer systems, such as a personal computer (PC) 481, a server 482, and a printer 483, via the LAN interface 418 and the local area network or the wide area network N1.

The computer system 400 reads and executes an image processing program recorded in a recording medium (e.g., the image processing program 141 of the first embodiment and the image processing program 141c of the second embodiment) to realize an image processing apparatus (e.g., the image processing apparatus 1 of the first embodiment and the image processing apparatus 1c of the second). The recording medium (device) may be any recording media that records an image processing program that can be read by the computer system 400. Examples of the recording media include a "portable physical medium" such as the CD-ROM 460, the USB memory 470, an MO disk, a DVD disk, a flexible disk (FD), and an IC card; a "fixed physical medium", such as the HDD 414 provided inside or outside of the computer system 400, the RAM 412, and the ROM 413; and a "communication medium", such as the public line N3 connected via the modem 450 and the local area network or the wide area network N1 connected to the PC 481 or the server 482 as other computer systems.

That is, the image processing program is recorded in a recording medium, such as the "portable physical medium", the "fixed physical medium", or the "communication medium", in a computer-readable manner, and the computer system 400 reads and executes the image processing program from such a recording medium, thereby realizing the image processing apparatus. The image processing program is not limited to that executed by the computer system 400. The present invention can be applied to a case in which the PC 481 or the server 482 as the other computer system performs the image processing program, or these device execute the image processing program in cooperation with each other.

The present invention is not limited to the first to the third embodiments and the above modification as they are. Various other inventions can be made by appropriately combine any components disclosed in the first and the second embodiments and the first and the second modifications. For example, it is possible to remove some components from the components described in the embodiments and the modification. It is also possible to appropriately combine any components that are described in different embodiments or modification.

According to an aspect of the present invention described above, it is possible to appropriately connect discontinued edges.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a processor comprising hardware, wherein the processor is configured to implement:
a contour-candidate-edge detecting unit that detects edges on the basis of a gradient magnitude of each pixel in a target image, and sets the edges as contour candidate edges;
a contour-edge detecting unit that detects contour edges by performing thresholding on gradient magnitudes of the contour candidate edges;
an interpolation-line generating unit that generates a plurality of interpolation lines for connecting end points of respective end-point pair on the basis of gradients of pixel values between the end points of the respective end-point pairs, each of the end point pairs being made up of an end point of an identical contour edge as a connection base and an end point of a different contour edge as a connection destination; and
a contour-edge interpolating unit that selects one of the interpolation lines on the basis of gradients of pixel values of pixels on the interpolation lines, and interpolates a contour edge between the end points which are to be connected with the selected interpolation line, with the selected interpolation line.

2. The image processing apparatus according to claim 1, wherein each of the contour candidate edges is a line edge with a 1-pixel width.

3. The image processing apparatus according to claim 1, wherein the contour-candidate-edge detecting unit further includes a branched-edge removing unit that removes, when any of the edges is branched and a length from a branch point to an end point of the edge is shorter than a predetermined length, an edge portion from the branch point to the end point of the edge.

4. The image processing apparatus according to claim 1, wherein the contour-candidate-edge detecting unit further includes a contour-candidate-edge selecting unit that selects, as the contour candidate edges, edge portions that are contained in an area other than a flat area in which a change in a gradient is small in the target image.

5. The image processing apparatus according to claim 1, wherein the interpolation-line generating unit includes
   an end-point detecting unit that detects end points of the contour edges;
   an end-point-pair selecting unit that selects one of the end points of the contour edges as the connection base and selects a plurality of end points of different contour edges as the connection destinations for the selected end point in order to form the end-point pairs;
   an initial-interpolation-line generating unit that generates initial paths for the interpolation lines that connect the end points of the respective end-point pairs; and
   an interpolation-line optimizing unit that optimizes each of the initial paths of the interpolation lines so that a cost value that is determined by gradients of pixel values of pixels on each of the interpolation lines becomes smallest.

6. The image processing apparatus according to claim 5, wherein the end-point-pair selecting unit selects the end points of the different contour edges as the connection destinations on the basis of at least one of a distance from the end point of the contour edge as the connection base and a direction of a gradient at the end point of the contour edge as the connection base.

7. The image processing apparatus according to claim 5, wherein the initial-interpolation-line generating unit includes
   an approximate-curved-surface generating unit that generates an approximate curved surface by approximating a change in the pixel values of the respective pixels in the target image; and
   an initial-interpolation-line determining unit that determines a plane, which is perpendicular to a straight line passing through positions, the positions being on the approximate curved surface and corresponding to coordinates of end points as an end-point pair, and which contains a straight line parallel to a coordinate plane of the target image, and that sets, as an initial path of an interpolation line, a line segment connecting the end points of the end-point pair on an intersecting line between the plane and the approximate curved surface.

8. The image processing apparatus according to claim 7, wherein the approximate-curved-surface generating unit generates the approximate curved surface by performing function approximation on the change in the pixel values of the respective pixels in the target image.

9. The image processing apparatus according to claim 7, wherein the approximate-curved-surface generating unit generates the approximate curved surface by performing low-pass filter processing on the target image.

10. The image processing apparatus according to claim 5, wherein the initial-interpolation-line generating unit determines a straight line connecting the end points of each of the end-point pairs as the initial path of a corresponding interpolation line.

11. The image processing apparatus according to claim 5, wherein the initial-interpolation-line generating unit determines an approximate curve connecting the end points of each of the end-point pairs as the initial path of a corresponding interpolation line.

12. The image processing apparatus according to claim 5, wherein the interpolation-line optimizing unit includes
   a control-point setting unit that sets control points on each of the initial paths of the interpolation lines at regular intervals; and
   an interpolation-line updating unit that updates each of the initial paths of the interpolation line by moving the control points so that the cost values at the respective control points are reduced.

13. The image processing apparatus according to claim 5, wherein the interpolation-line optimizing unit calculates the cost value on the basis of a direction of the contour edge at each pixel on each of the interpolation lines and on the basis of a direction in which a change in the gradients of the pixels on each of the interpolation lines becomes greatest.

14. The image processing apparatus according to claim 5, wherein the interpolation-line optimizing unit includes a path searching unit that searches for a path with which the cost value becomes the smallest by using a path search algorithm.

15. The image processing apparatus according to claim 1, wherein the contour-edge interpolating unit includes
   a gradient-cost acquiring unit that sets a plurality of reference points on each of the interpolation lines and acquires the cost value at each of the set reference points;
   an interpolation-line selecting unit that compares the cost values at the respective reference points between the interpolation lines, and selects an interpolation line, of which cost value is smallest and is equal to or smaller than a predetermined threshold, from among the interpolation lines; and
   an interpolation-contour-edge forming unit that generates an interpolated contour edge by using the interpolation line selected by the interpolation-line selecting unit, the contour edge having the end point being the connection base of the end-point pair to be connected by the interpolation line, and the contour edge having the end point being the connection destination of the end-point pair to be connected by the interpolation line.

16. The image processing apparatus according to claim 15, wherein the gradient-cost acquiring unit sets the same number of the reference points on each of the interpolation lines.

17. An image processing method comprising:
   detecting, by a processor comprising hardware, edges on the basis of a gradient magnitude of each pixel in a target image and setting the edges as contour candidate edges;
   detecting, by the processor, contour edges by performing thresholding on gradient magnitudes of the contour candidate edges;
   generating, by the processor, a plurality of interpolation lines for connecting end points of respective end-point pairs on the basis of gradients of pixel values between the end points of the respective end-point pairs, each of the end point pairs being made up of an end point of an identical contour edge as a connection base and an end point of a different contour edge as a connection destination; and
   interpolating, by the processor, a contour edge between the end points to be connected by an interpolation line, the interpolating including selecting one of the interpolation lines on the basis of gradients of pixel values of pixels on the interpolation lines and interpolating the contour edge between the end points with the selected interpolation line.

18. A non-transitory computer-readable storage device with an executable program stored thereon, wherein the program instructs a processor comprising hardware to perform:
- detecting edges on the basis of a gradient magnitude of each pixel in a target image and setting the edges as contour candidate edges;
- detecting contour edges by performing thresholding on gradient magnitudes of the contour candidate edges;
- generating a plurality of interpolation lines for connecting end points of respective end-point pairs on the basis of gradients of pixel values between the end points of the respective end-point pairs, each of the end point pairs being made up of an end point of an identical contour edge as a connection base and an end point of a different contour edge as a connection destination; and
- interpolating a contour edge between end points to be connected by an interpolation line, the interpolating including selecting one of the interpolation lines on the basis of gradients of pixel values of pixels on the interpolation lines and interpolating the contour edge between the end points with the selected interpolation line.

* * * * *